US011411276B2

(12) United States Patent
Kinoshita et al.

(10) Patent No.: US 11,411,276 B2
(45) Date of Patent: Aug. 9, 2022

(54) BATTERY PACK

(71) Applicant: DENSO CORPORATION, Kariya (JP)

(72) Inventors: Hidehiro Kinoshita, Kariya (JP); Masato Niwa, Kariya (JP)

(73) Assignee: DENSO CORPORATION, Kariya (JP)

( * ) Notice: Subject to any disclaimer, the term of this patent is extended or adjusted under 35 U.S.C. 154(b) by 203 days.

(21) Appl. No.: 16/809,284

(22) Filed: Mar. 4, 2020

(65) Prior Publication Data

US 2020/0203688 A1 Jun. 25, 2020

Related U.S. Application Data

(63) Continuation of application No. PCT/JP2018/043443, filed on Nov. 26, 2018.

(30) Foreign Application Priority Data

Jan. 23, 2018 (JP) ............................ JP2018-008924

(51) Int. Cl.

| | |
|---|---|
| ***H01M 50/20*** | (2021.01) |
| ***B60L 50/64*** | (2019.01) |
| ***H01M 10/42*** | (2006.01) |
| ***H01M 50/10*** | (2021.01) |

(52) U.S. Cl.

CPC ............ *H01M 50/20* (2021.01); *B60L 50/64* (2019.02); *H01M 10/425* (2013.01); *H01M 50/10* (2021.01); *H01M 2010/4271* (2013.01); *H01M 2220/20* (2013.01)

(58) Field of Classification Search

CPC .................................................... H01M 50/20

See application file for complete search history.

(56) References Cited

U.S. PATENT DOCUMENTS

| | | | | |
|---|---|---|---|---|
| 7,807,282 B2 * | 10/2010 | Hamada | ............. | H01M 50/325 429/86 |
| 2011/0111273 A1 * | 5/2011 | Okada | .................. | H01M 50/20 429/88 |
| 2014/0011056 A1 | 1/2014 | Adachi | | |

* cited by examiner

*Primary Examiner* — Maria Laios
*Assistant Examiner* — Jordan E Berresford
(74) *Attorney, Agent, or Firm* — Oliff PLC

(57) ABSTRACT

A battery pack includes: an assembled battery having battery cells; a battery case that houses the assembled battery; a wiring case assembled to the battery case; and an elastic member held between the battery cell and the wiring case. A safety valve is formed on one surface of the battery cell. The elastic member has a first end surface that comes in contact with a region in which the safety valve is not formed on the one surface of the battery cell, and a second end surface that comes in contact with a facing surface of the wiring case that faces the one surface. The wiring case has a regulation member that comes in contact with a side surface of the elastic member which connects the first end surface to the second end surface.

15 Claims, 27 Drawing Sheets

BATTERY PACK

CROSS REFERENCE TO RELATED APPLICATION

The present application is a continuation application of International Patent Application No. PCT/JP2018/043443 filed on Nov. 26, 2018, which designated the U.S. and claims the benefit of priority from Japanese Patent Application No. 2018-008924 filed on Jan. 23, 2018. The entire disclosures of all of the above applications are incorporated herein by reference.

TECHNICAL FIELD

The present disclosure relates to a battery pack having plural batteries.

BACKGROUND ART

An assembled battery module includes battery cells, a case housing the battery cells, an insulating cover assembled to the case, and an exhaust duct that is assembled to the insulating cover.

SUMMARY

According to an aspect of the present disclosure, a battery pack includes: an assembled battery having a plurality of battery cells;

a battery case that houses the assembled battery;

a wiring case that is assembled to the battery case;

a coupling portion that connects the battery case and the wiring case in a state that the battery case and the wiring case come close to each other; and an elastic member that comes in contact with the battery cell and the wiring case and is held between the battery cell and the wiring case.

A safety valve having a locally low rigidity is formed on one surface of the battery cell, a first end surface of the elastic member comes in contact with a region in which the safety valve is not formed on the one surface of the battery cell, and a second end surface of the elastic member opposite to the first end surface comes in contact with a facing surface of the wiring case that faces the one surface, and the wiring case has a regulation member that comes in contact with a side surface of the elastic member which connects the first end surface to the second end surface to regulate movement of the elastic member in a surface direction along the one surface.

DESCRIPTION OF EMBODIMENTS

Figure 1:
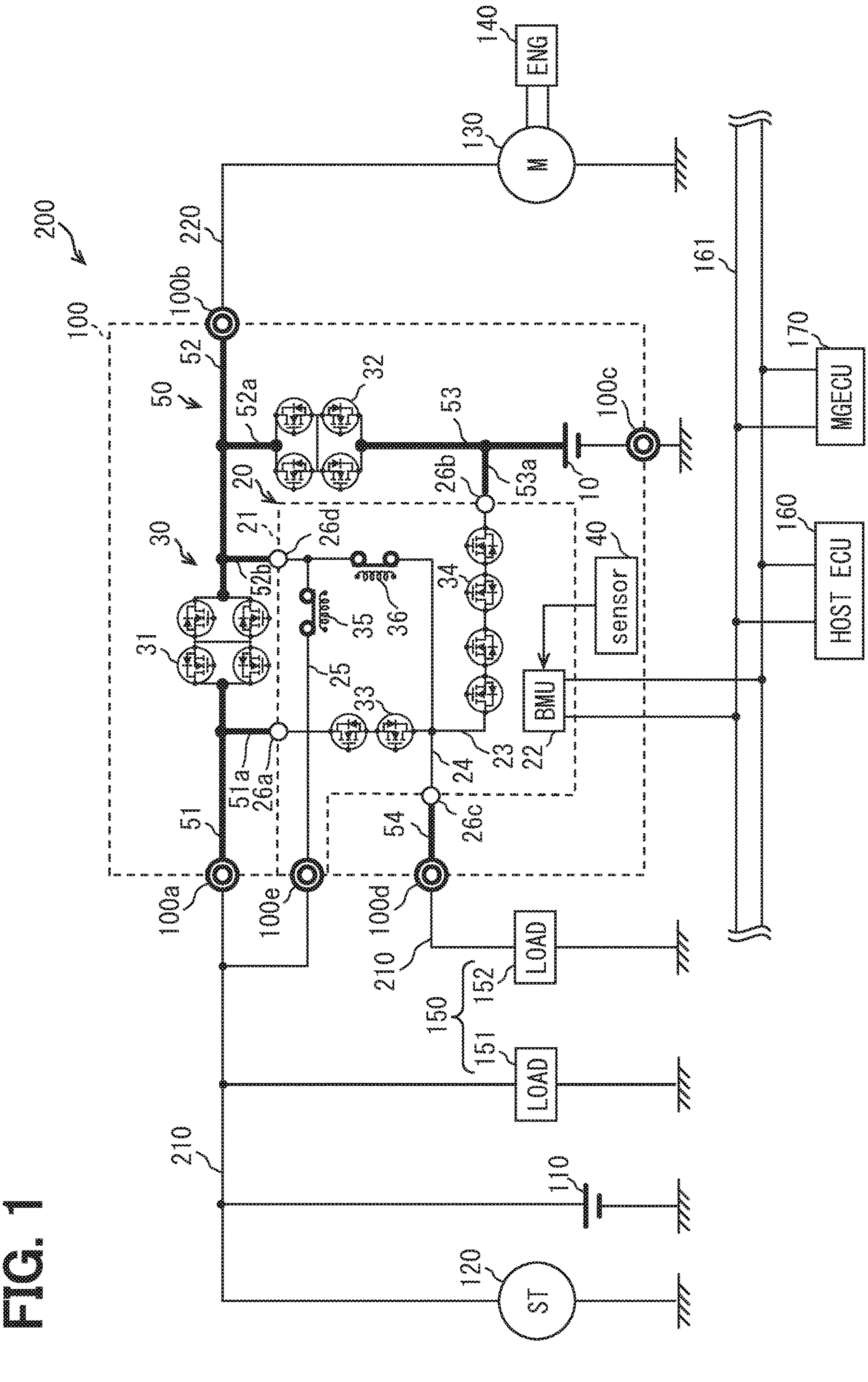
FIG. 1 is a circuit diagram illustrating a power supply system.

To begin with, examples of relevant techniques will be described.

An assembled battery module includes multiple cells, a battery case housing the cells, and an insulating cover assembled to the battery case.

A positive electrode terminal and a negative electrode terminal protrude from a side surface of each of the multiple single cells. An exhaust valve is formed between a positive electrode terminal and a negative electrode terminal on the side surface of the battery. The exhaust valve is formed by closing a hole opened in an end surface of an outer case of the single cells with a thin metal film. The metal film breaks when an internal pressure of the single cell becomes abnormal. As a result, a gas and an electrolytic solution inside the battery are discharged to an outside of the battery.

In a state in which the single cells are housed in the battery case, the positive electrode terminals and the negative electrode terminals of the single cells protrude out of the battery case. The insulating cover is assembled to the battery case so as to cover a portion of the single cells protruding from the battery case. The battery case and the insulating cover are assembled by mounting metal fittings.

In addition to those components, the assembled battery module has an exhaust duct that is assembled to the insulating cover. The insulating cover is provided with a coupling bar. An insertion portion for inserting the coupling bar is provided in the exhaust duct. An external thread is formed on a tip portion of the coupling bar. A nut is screwed to the external thread of the tip portion of the bar in a state in which the coupling bar is inserted through the insertion portion of the exhaust duct. As a result, the exhaust duct is assembled to the insulating cover.

The assembled battery module has a packing. The insulating cover has a recess portion in which a packing is provided. The packing is in contact with the battery side surfaces of the single cells and the exhaust duct in the recess portion of the insulating cover, and is held between those components. The contact between the single cell of the packing and the exhaust duct is made by screwing the insulating cover and the exhaust duct with a nut.

With the configuration described above, the movement of the packing in the direction along the side surface of the battery is restricted by the recess portion of the insulating cover. As a result, a contact between the packing and the exhaust valve is inhibited. Further, the single cells of the packing and the exhaust duct are brought into contact with each other by screwing the exhaust duct and the insulating cover with a nut. The single cells are fixed.

As described above, the assembled battery module has two components of the insulating cover and the exhaust duct in order to inhibit the contact of the packing (elastic member) with the exhaust valve (safety valve) and to achieve the contact of the single cells of the packing and the exhaust duct. As a result, the number of parts are large.

The present disclosure provides a battery pack that inhibits an increase in the number of components and the contact of the elastic member with the safety valve.

According to an aspect of the present disclosure, a battery pack includes: an assembled battery having a plurality of battery cells;

a battery case that houses the assembled battery;

a wiring case that is assembled to the battery case;

a coupling portion that connects the battery case and the wiring case in a state that the battery case and the wiring case come close to each other; and an elastic member that comes in contact with the battery cell and the wiring case and is held between the battery cell and the wiring case.

A safety valve having a locally low rigidity is formed on one surface of the battery cell, a first end surface of the elastic member comes in contact with a region in which the safety valve is not formed on the one surface of the battery cell, and a second end surface of the elastic member opposite to the first end surface comes in contact with a facing surface of the wiring case that faces the one surface, and the wiring case is formed with a regulation member that comes in contact with a side surface of the elastic member which connects the first end surface to the second end surface to regulate movement of the elastic member in a surface direction along the one surface.

As described above, the elastic member comes in contact with each of the battery cells and the wiring case by the connection of the battery case and the wiring case, and is held between the battery cell and the wiring case. The regulation member formed on the wiring case regulates the movement of the elastic member in a surface direction along one surface. As a result, the contact of the elastic member with the safety valve is inhibited.

According to the above configuration, an increase in the number of components is inhibited, as compared with a configuration in which the contact of the elastic member with the safety valve is inhibited by the wiring case and the contact of the elastic member with each of the battery cell and the wiring case is inhibited by a different case from the wiring case.

Embodiments will be described below with reference to the drawings.

First Embodiment

A battery pack 100 and a power supply system 200 including the battery pack 100 according to the present embodiment will be described with reference to FIGS. 1 to 10. In FIG. 2, a wiring case 62, a coupling busbar 70, and a packing 90, which will be described later, are not illustrated.

<Outline of Power Supply System>

The power supply system 200 is mounted on a vehicle. The power supply system 200 includes multiple vehicle-mounted devices mounted on a vehicle and the battery pack 100. One of the vehicle-mounted devices is a lead storage battery 110. The battery pack 100 includes an assembled battery 10. In the power supply system 200, the lead storage battery 110 and the assembled battery 10 configure a two-power supply system.

Another vehicle-mounted device is an engine 140. The vehicle equipped with the power supply system 200 has an idle stop function of stopping the engine 140 when a predetermined stop condition is satisfied, and restarting the engine 140 when a predetermined start condition is satisfied.

Figure 2:
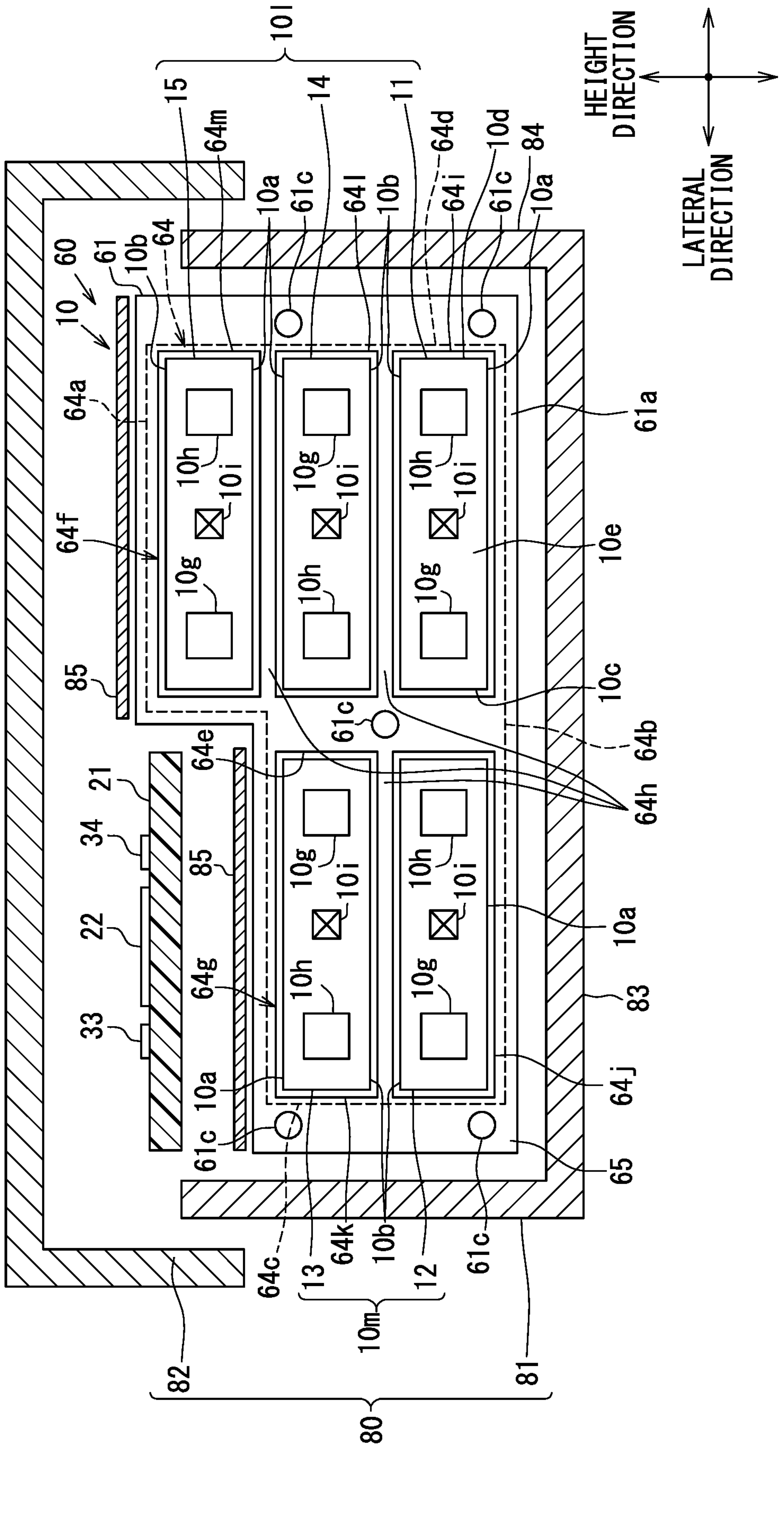
FIG. 2 is a cross-sectional view illustrating a configuration of a battery pack.

As shown in FIG. 1, the power supply system 200 includes a starter motor 120, a rotary electric machine 130, an electric load 150, a host ECU 160, and an MGECU 170 in addition to the lead storage battery 110 and the engine 140. Each of the lead storage battery 110, the starter motor 120, and the electric load 150 is electrically connected to the battery pack 100 through a first wire harness 210. The rotary electric machine 130 is electrically connected to the battery pack 100 through a second wire harness 220.

The host ECU 160 and the MGECU 170 are electrically connected to the lead storage battery 110 and the battery pack 100 through wires (not shown). In the same manner, other various types of ECUs mounted on the vehicle are electrically connected to the lead storage battery 110 and the battery pack 100 through wires (not shown).

As described above, the power supply system 200 builds a two-power supply system in which the lead storage battery 110 and the battery pack 100 (assembled battery 10) are used as power supplies.

<Components of Power Supply System>

The lead storage battery 110 generates an electromotive voltage by a chemical reaction. The lead storage battery 110 has a larger storage capacity than that of the assembled battery 10.

The starter motor 120 starts the engine 140. The starter motor 120 is mechanically coupled to the engine 140 when the engine 140 is started. A crankshaft of the engine 140 is rotated by the rotation of the starter motor 120. When the number of revolutions of the crankshaft of the engine 140 exceeds a predetermined number of revolutions, an atomized fuel is injected from a fuel injection valve into a combustion chamber. At this time, a spark is generated by an ignition plug. As a result, the fuel explodes, and the engine 140 starts to rotate autonomously. A propulsive force of the vehicle is obtained by a power of the engine 140. When the engine 140 starts to rotate autonomously, a mechanical connection between the starter motor 120 and the engine 140 is released.

The rotary electric machine 130 performs a power running and a power generation. An inverter (not shown) is connected to the rotary electric machine 130. The inverter is electrically connected to the second wire harness 220.

The inverter converts a DC voltage supplied from at least one of the lead storage battery 110 and the assembled battery 10 of the battery pack 100 into an AC voltage. The AC voltage is supplied to the rotary electric machine 130. As a result, the rotary electric machine 130 performs the power running.

The rotary electric machine 130 is connected to the engine 140. The rotary electric machine 130 and the engine 140 can transmit a rotational energy to each other through a belt or the like. The rotational energy generated by the power running of the rotary electric machine 130 is transmitted to the engine 140. This promotes rotation of the engine 140. As a result, a vehicle traveling is assisted. As described above, the vehicle on which the power supply system 200 is mounted has an idle stop function. The rotary electric machine 130 not only assists the vehicle traveling, but also functions to rotate the crankshaft when the engine 140 is restarted.

The rotary electric machine 130 also has a function of generating an electric power by at least one of rotational energy of the engine 140 and a rotational energy of wheels of the vehicle. The rotary electric machine 130 generates an AC voltage by power generation. The AC voltage is converted into a DC voltage by an inverter. The DC voltage is supplied to each of the battery pack 100, the lead storage battery 110, and the electric load 150.

The engine 140 is driven by combustion of the fuel to generate a propulsive force of the vehicle. As described above, when the engine 140 is started, the crankshaft is rotated by the starter motor 120. However, when the engine 140 is restarted after being stopped once by the idle stop, if the predetermined starting condition is satisfied, the crankshaft is rotated by the rotary electric machine 130.

The electric load 150 has a general load 151 and a protective load 152. The general load 151 includes a vehicle-mounted device such as a seat heater, a blower fan, an electric compressor, a room lamp, and a headlight, which are not necessarily supplied with a constant electric power. The protective load 152 includes a vehicle-mounted device such as an electric shift position, an electric power steering (EPS), a brake (ABS), a door lock, a navigation system, and audio, which are required to have a constant power supply. The illustrated protective load 152 has a property of switching from an on-state to an off-state when a supply voltage falls below a reset threshold. The protective load 152 includes a vehicle-mounted device having a higher relevance to vehicle traveling than the general load 151. Incidentally, the configuration in which the above-described various vehicle-mounted devices are included in the general load 151 and the protective load 152 is merely an example. The various vehicle-mounted devices can be appropriately sorted into the general load 151 and the protective load 152 in accordance with a change in the in-vehicle system or the like. For example, a configuration in which EPS or ABS is included in the general load 151 can be employed.

The host ECU 160 and the MGECU 170 are one of various ECUs mounted on the vehicle. Those various ECUs are electrically connected to each other through a bus wiring 161, and build an in-vehicle network. The various ECUs cooperatively control the combustion of the engine 140, the power running and the power generation of the rotary electric machine 130, and the like. The host ECU 160 controls the battery pack 100. The MGECU 170 controls the rotary electric machine 130.

Although not illustrated, the power supply system 200 includes sensors for measuring physical quantities such as various voltages and currents, and vehicle information such as an accelerator pedal depression amount and a throttle valve opening degree, in addition to the vehicle-mounted devices described above. Detection signals detected by those various types of sensors are input to various types of ECUs.

<Battery Pack Outline>

Figure 6:
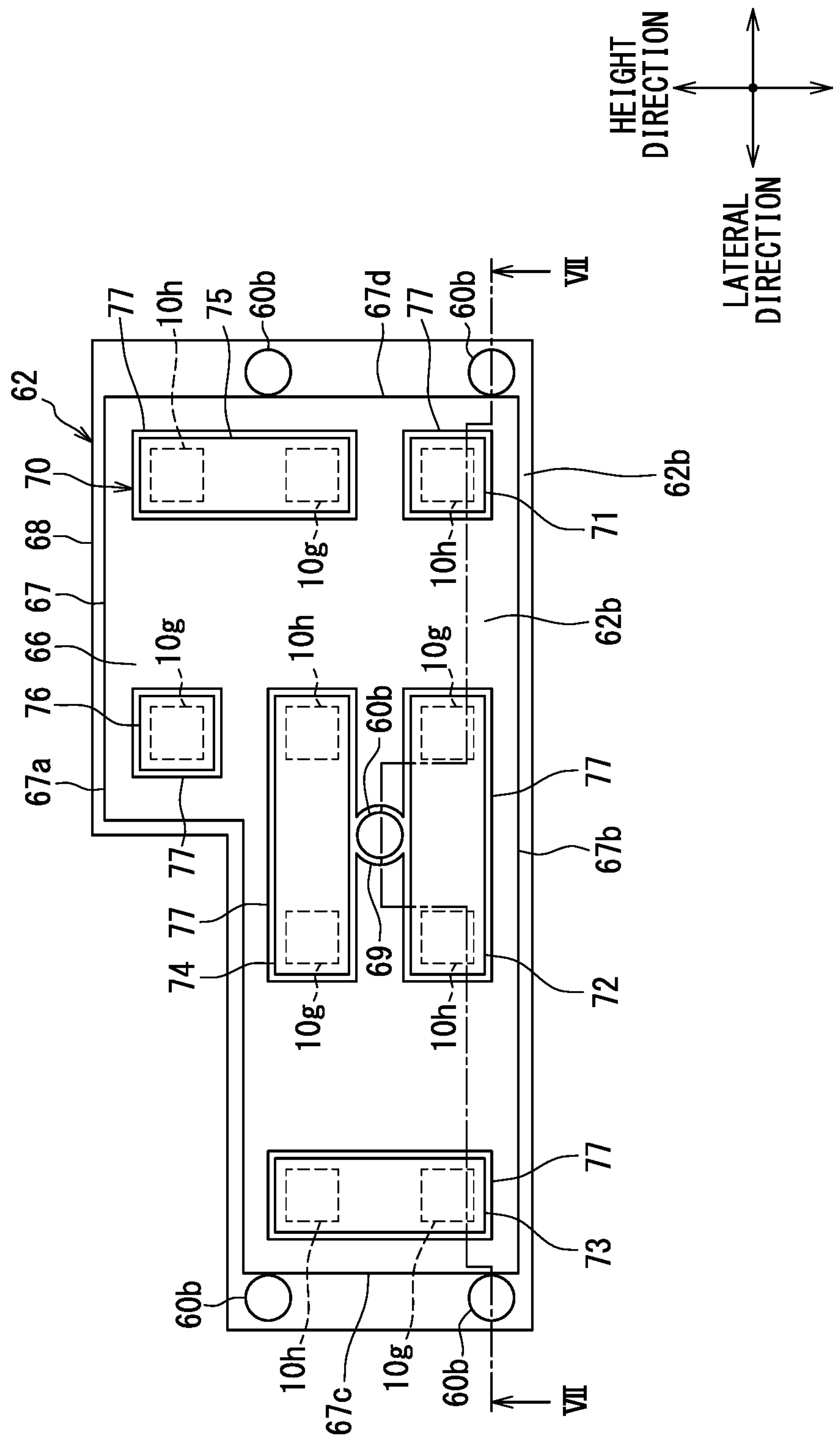
FIG. 6 is a front view showing a battery module.

As shown in FIG. 1, the battery pack 100 includes the assembled battery 10, a circuit board 20, a switch 30, a sensor unit 40, and a power supply busbar 50. As shown in FIGS. 2 and 6, the battery pack 100 includes a module case 60, a coupling busbar 70, a pack case 80, and the packing 90.

The circuit board 20 has a wiring board 21 and a BMU 22. A part of the switch 30 and the BMU 22 are mounted on the wiring board 21. The remaining part of the switch 30 and the assembled battery 10 are electrically connected to the circuit board 20 through the power supply busbar 50. This forms an electric circuit of the battery pack 100. The sensor unit 40 is electrically connected to the electric circuit through an insulated electric wire or the like.

An electric circuit of the battery pack 100 is electrically connected to external connection terminals indicated by double circles in FIG. 1. The external connection terminals include a first external connection terminal 100*a*, a second external connection terminal 100*b*, a third external connection terminal 100*c*, a fourth external connection terminal 100*d*, and a fifth external connection terminal 100*e*.

The first external connection terminal 100*a*, the fourth external connection terminal 100*d*, and the fifth external connection terminal 100*e* are electrically connected to the lead storage battery 110, the starter motor 120, and the electric load 150 through the first wire harness 210. The second external connection terminal 100*b* is electrically connected to the rotary electric machine 130 through the second wire harness 220. The third external connection terminal 100*c* is bolted to a body of the vehicle. A bolt inserted into the third external connection terminal 100*c* functions to connect the battery pack 100 and the body of the vehicle. As a result, the battery pack 100 is grounded to the body.

As shown in FIG. 1, the first wire harness 210 is divided into one harness for connecting a lead storage battery 110, a starter motor 120, and a general load 151, and the other harness for connecting a protective load 152. The end portion of the first wire harness 210 connecting the lead storage battery 110, the starter motor 120, and the general load 151 is bifurcated. One of the bifurcated end portions is connected to the first external connection terminal 100*a*, and the other is connected to the fifth external connection terminal 100*e*. An end portion of the first wire harness 210 connected to the protective load 152 is connected to the fourth external connection terminal 100*d*.

Figure 3:
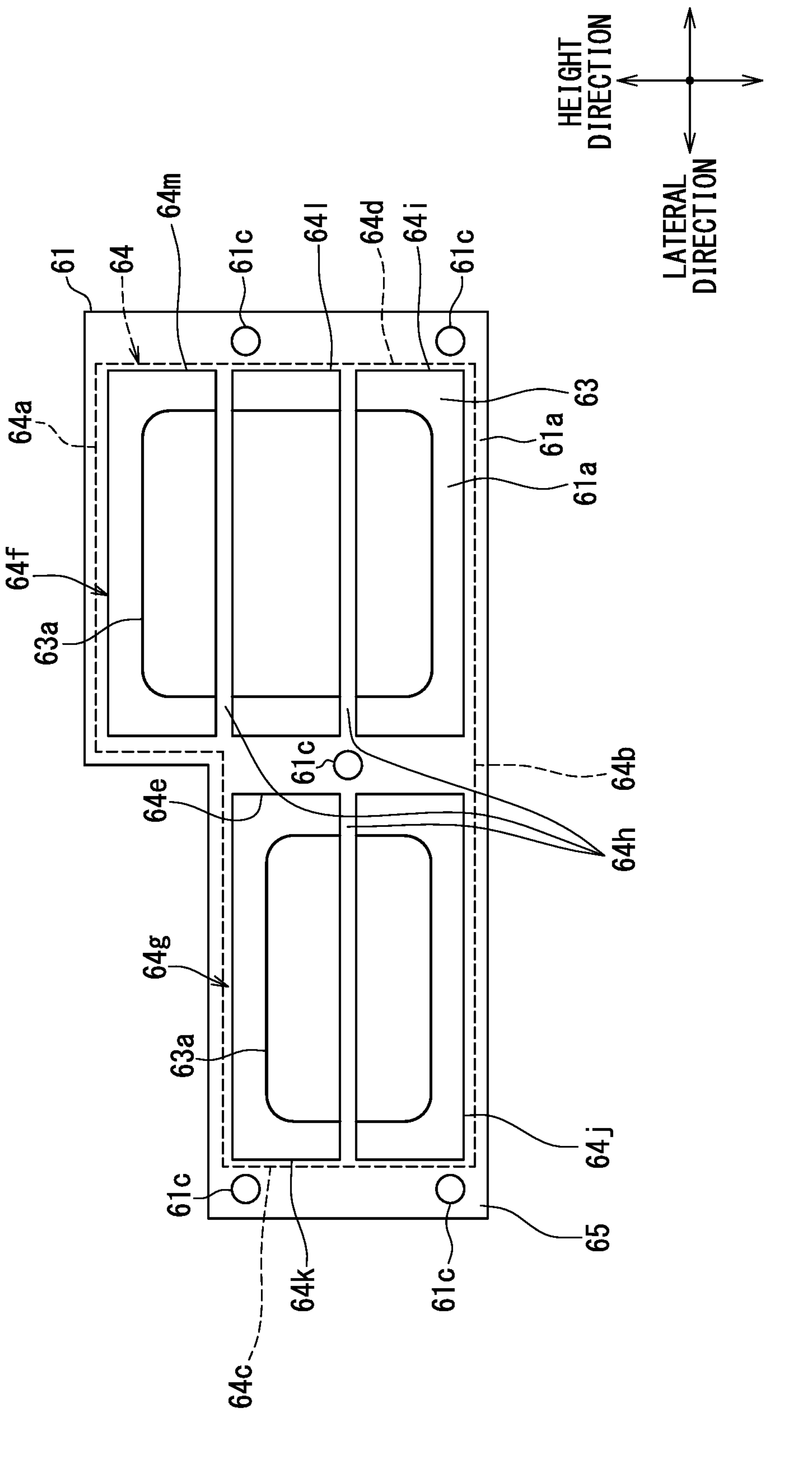
FIG. 3 is a front view showing a battery case.
Figure 4:
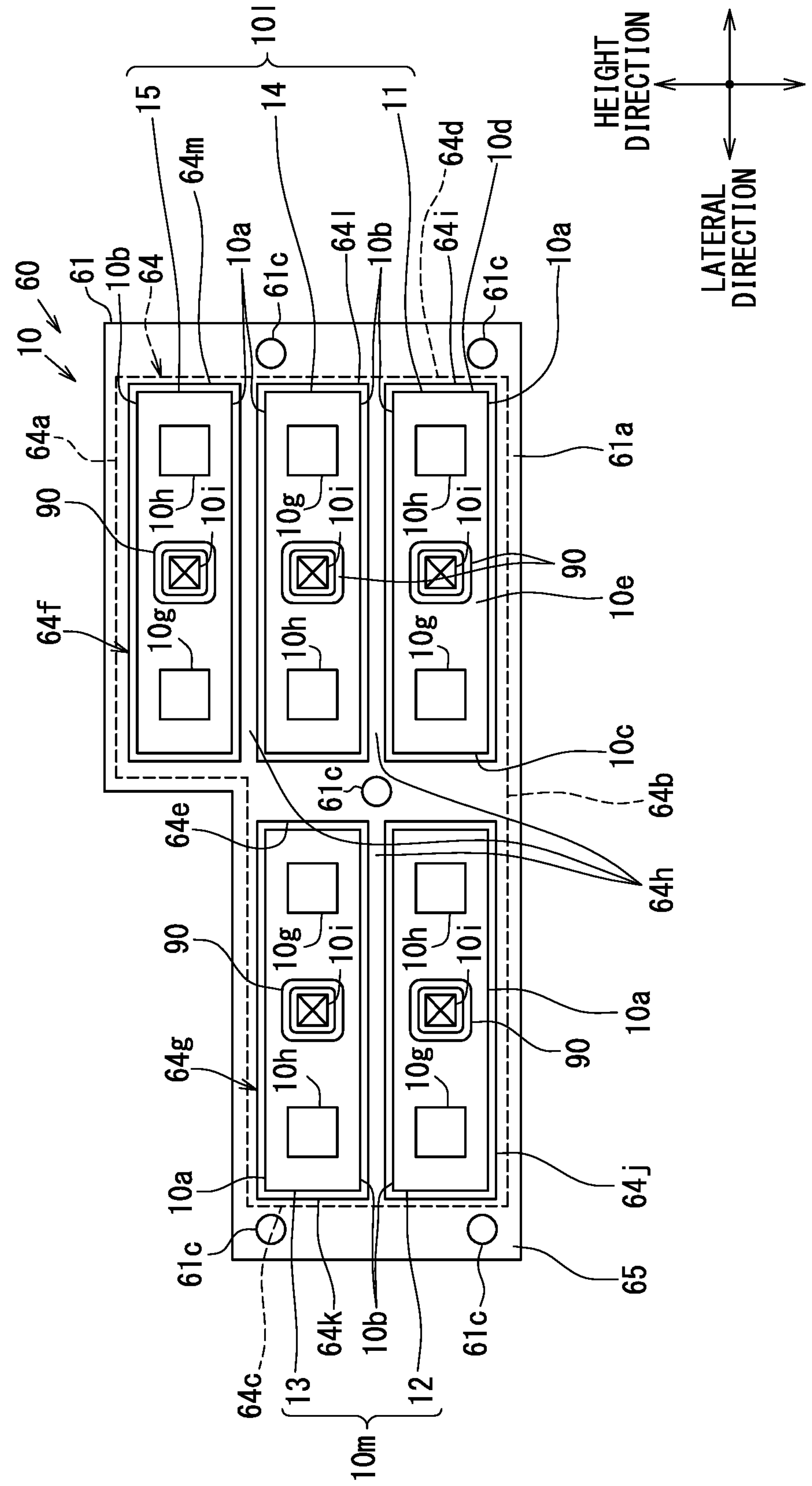
FIG. 4 is a front view showing am assembled battery housed in the battery case.
Figure 5:
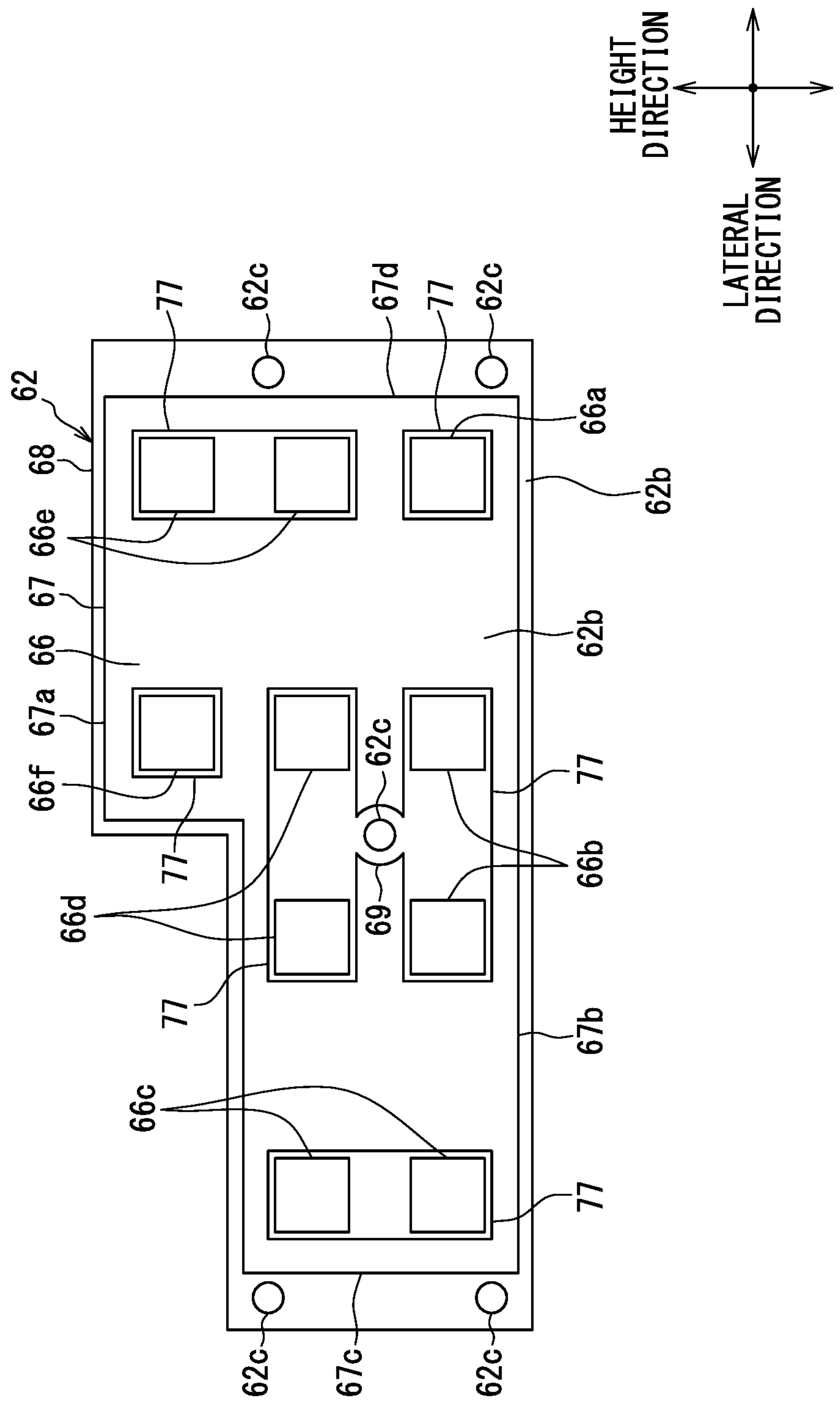
FIG. 5 is a front view showing a wiring case.

As shown in FIGS. 3 and 5, the module case 60 has a battery case 61 and a wiring case 62. As shown in FIG. 4, the assembled battery 10 is housed in the battery case 61. As shown in FIG. 6, the wiring case 62 is connected to the battery case 61. As a result, the assembled battery 10 is housed in the battery case 61 and the wiring case 62. The electrode terminals of the multiple battery cells configuring the assembled battery 10 are electrically connected in series with each other through the coupling busbar 70. As a result, a battery module is formed. The packing 90 is also housed in the battery case 61 and the wiring case 62. In FIG. 4, a position of the packing 90 provided in the assembled battery 10 is shown in a simplified manner.

The pack case 80 has a housing 81 and a cover 82. The housing 81 and the cover 82 configure a housing space. Each of the assembled battery 10, the packing 90, the module case 60, the coupling busbar 70, the circuit board 20, the switch 30, the sensor unit 40, and the power supply busbar 50 is housed in the housing space.

<Battery Pack Components>

The assembled battery 10 has multiple battery cells. The battery cell is specifically a lithium ion battery. The lithium ion battery generates an electromotive voltage by a chemical reaction. The generation of the electromotive voltage causes a current to flow through the battery cell. As a result, the battery cell generates a heat to generate a gas. As a result, the battery cell expands. The battery cell is not limited to the above example. For example, a secondary battery such as a nickel-hydrogen secondary battery or an organic radical battery can be employed as the battery cell.

As described above, the circuit board 20 has the wiring board 21 and the BMU 22. The wiring board 21 is a printed circuit board in which a wiring pattern made of a conductive material is formed on an insulating substrate. A first power supply line 23, a second power supply line 24, and a third power supply line 25 are formed as wiring patterns on at least one of a surface and an inside of the insulating substrate. The wiring board 21 is fixed to the housing 81 through bolts (not shown). As shown in FIG. 2, the wiring board 21 (circuit board 20) is provided between the battery case 61 (module case 60) and the cover 82.

Terminals electrically connected to the wiring patterns are formed on the wiring board 21. The terminals include a first internal terminal 26*a*, a second internal terminal 26*b*, a third internal terminal 26*c*, and a fourth internal terminal 26*d*. The wiring board 21 is provided with the fifth external connection terminal 100*e* described above. The fifth external connection terminal 100*e* is a connector. The fifth external connection terminal 100*e* is also electrically connected to the wiring pattern. The electrical connection between the wiring patterns, the internal terminals, and the fifth external connection terminal 100*e* will be described together with a later description of a circuit configuration of the battery pack 100.

The switch 30 includes a first switch 31, a second switch 32, a third switch 33, a fourth switch 34, a fifth switch 35, and a sixth switch 36. The first switch 31 and the second switch 32 are mounted on the housing 81. The third switch 33 and the fourth switch 34, and the fifth switch 35 and the sixth switch 36 are mounted on the wiring board 21.

Each of the first switch 31 to the fourth switch 34 has a semiconductor switch. Specifically, the semiconductor switch is an N-channel MOSFET. Therefore, each of the first switch 31 to the fourth switch 34 is closed by the input of a high-level control signal. Each of the first switch 31 to the fourth switch 34 is opened by the input of a low-level control signal.

An IGBT or the like may be employed as a semiconductor switch included in each of the first switch 31 to the fourth switch 34. Diodes are connected in parallel to the IGBT.

Each of the fifth switch 35 and the sixth switch 36 is a mechanical relay. More specifically, each of the fifth switch 35 and the sixth switch 36 is a normally closed type electromagnetic relay. Therefore, each of the fifth switch 35 and the sixth switch 36 is opened by the input of the high-level control signal. Each of the fifth switch 35 and the sixth switch 36 is closed by the input of a low-level control signal. In other words, the fifth switch 35 and the sixth switch 36 are closed when the input of the high-level control signal is stopped.

Each of the first switch 31 to the fourth switch 34 has at least one opening and closing portion in which two MOSFETs are connected in series. The source electrodes of those two MOSFETs are connected to each other. Gate electrodes of two MOSFETs are electrically independent of each other. The MOSFET has a parasitic diode. The parasitic diodes of the two MOSFETs have anode electrodes connected to each other. The gate electrode is electrically connected to the circuit board 20 through an internal conductive member (not shown).

The first switch 31 and the second switch 32 have multiple opening and closing portions. The multiple opening and closing portions are connected in parallel to each other. The source electrodes of the multiple opening and closing portions are electrically connected to each other.

The third switch 33 has one opening and closing portion. The fourth switch 34 has multiple opening and closing portions. The multiple opening and closing portions of the fourth switch 34 are connected in series to each other.

FIG. 1 shows two opening and closing portions units connected in parallel with each other in each of the first switch 31 and the second switch 32. FIG. 1 shows two opening and closing portions connected in series with each other in the fourth switch 34. The number of those opening and closing portions can be appropriately determined in accordance with the amount of current, redundancy, and the like.

Each of the first switch 31 to the fourth switch 34 has a resin portion covering the opening and closing portion. The resin portion has a rectangular parallelepiped shape. The resin portion has a flat shape with a small length (thickness) between two main surfaces having the largest area.

A bolt hole penetrating through the two main surfaces are provided in a resin portion of each of the first switch 31 and the second switch 32. An attachment hole corresponding to the bolt hole of the resin portion is provided in the housing 81. Bolts are fastened to the bolt hole of the resin portion and the attachment hole of the housing 81. As a result, the first switch 31 and the second switch 32 are fixed to the housing 81 and thermally connected to each other. An insulating film is provided between the resin portion and the heat radiation portion.

As described above, the sensor unit 40 is electrically connected to the electric circuit. The sensor unit 40 includes sensor elements for detecting a state of each of the assembled battery 10 and the switch 30. The sensor unit 40 includes a temperature sensor, a current sensor, and a voltage sensor as sensor elements.

The sensor unit 40 detects the temperature, current, and voltage of the assembled battery 10. The sensor unit 40 outputs the detected temperature, current, and voltage to the BMU 22 as state signals of the assembled battery 10. The sensor unit 40 detects the temperature, current, and voltage of the switch 30. The sensor unit 40 outputs the detected temperature, current, and voltage to the BMU 22 as state signals of the switch 30.

The sensor unit 40 includes a submergence sensor in addition to the various types of sensors described above. The submergence sensor has two counter electrodes. When water is present between the two counter electrodes, an electric current is passed between the two counter electrodes. This changes a resistance between the two counter electrodes. The change of the resistor is input to the BMU 22 as a state signal. The BMU 22 detects the submergence of the battery pack 100 based on whether or not the change in the resistance is continued for a predetermined period of time.

The BMU 22 controls the switch 30 based on at least one of the state signal of the sensor unit 40 and a command signal from the host ECU 160. As described above, each of the first switch 31 to the fourth switch 34 has multiple semiconductor switches. For example, when controlling the opening and closing of the first switch 31, the BMU 22 controls all the semiconductor switches included in the first switch 31 to be in a closed state at the same time or in an open state at the same time. In other words, the BMU 22 simultaneously outputs a high-level control signal or a low-level control signal to the gate electrodes of all the semiconductor switches included in the first switch 31. The BMU 22 may adjust a closing time of the semiconductor switches by intermittently outputting the high-level control signal in a period when the semiconductor switches are closed. Briefly, the BMU 22 may control a pulse width of the semiconductor switches. The BMU is an abbreviations of battery management unit.

The BMU 22 determines a state of charge (SOC) of the assembled battery 10 and the abnormality of the switch 30 based on the state signal of the sensor unit 40. The SOC is an abbreviation for state of charge. The BMU 22 outputs the SOC and the signal (determination information) determining the abnormality to the host ECU 160.

The host ECU 160 determines the control of the switch 30 based on the determination information input from the BMU 22 and the vehicle information input from the other various types of ECUs. The host ECU 160 outputs a command signal including the determined control of the switch 30 to the BMU 22.

The BMU 22 controls the switch 30 based on command signal from the host ECU 160. When the BMU 22 determines that the battery pack 100 is submerged based on the state signal of the submergence sensor, the BMU 22 independently stops outputting the control signal to the switch 30. As a result, the electrical connection of the assembled battery 10 is cut off.

Further, the BMU 22 restricts the driving of the switch 30 when the switch 30 is heated to a high temperature. For example, when the BMU 22 controls the pulse width of the semiconductor switches of the switch 30, the BMU 22 lowers a duty ratio of the semiconductor switch 30. This shortens an energization time of the semiconductor switches. As a result, the heat generation of the semiconductor switches is inhibited.

The power supply busbar 50 is made of a conductive material such as aluminum or copper. The power supply busbar 50 can be manufactured, for example, in the manners listed below. The power supply busbar 50 can be manufactured by bending a single flat plate. The power supply busbar 50 can be manufactured by integrally connecting multiple flat plates. The power supply busbar 50 can be manufactured by welding multiple flat plates. The power supply busbar 50 can be manufactured by pouring a molten conductive material into a mold. The power supply busbar 50 can also be manufactured by a manufacturing method different from the manufacturing method described above. The method of manufacturing the power supply busbar 50 is not particularly limited. In other words, for example, an insulated electric wire may be used as the power supply busbar 50.

The battery pack 100 includes a first power supply busbar 51, a second power supply busbar 52, a third power supply busbar 53, and a fourth power supply busbar 54 as the power supply busbar 50. The circuit board 20 is electrically connected to the assembled battery 10 and the circuit board 20 is electrically connected to the external connection terminal by the multiple power supply busbars. In FIG. 1, each of those power supply busbars is shown to be thicker than the power supply line of the wiring board 21.

As described above, the module case 60 includes the battery case 61 and the wiring case 62. Each of the battery case 61 and the wiring case 62 is made of an insulating resin material. A specific heat of each of the battery case 61 and the wiring case 62 is higher than that of air. The assembled battery 10 and the packing 90 are housed in a space defined by the battery case 61 and the wiring case 62.

The coupling busbar 70 is formed by a manufacturing method similar to that of the power supply busbar 50. The coupling busbar 70 is provided in the wiring case 62. The coupling busbar 70 electrically and mechanically connects multiple battery cells included in the assembled battery 10 to each other.

As described above, the pack case 80 includes the housing 81 and the cover 82. The housing 81 can be manufactured by aluminum die casting. The housing 81 can also be manufactured by pressing iron or stainless steel. The housing 81 has a bottom wall 83 and a side wall 84 raised annularly from the bottom wall 83. An opening is defined by the annular side wall 84. The opening is covered by the cover 82. This defines a housing space. The cover 82 is made of resin or metal.

Although not shown, a hole corresponding to the third external connection terminal 100*c* is defined in the bottom wall 83. A flange for connection with the body of the vehicle is connected to the bottom wall 83. The flange and the body of the vehicle are mechanically and thermally connected to each other through bolts. As a result, the battery pack 100 is fixed to the vehicle.

The battery pack case 80 (the battery pack 100) according to the present embodiment is provided below the seat of the vehicle. However, the placement of the battery pack 100 is not limited to the above example. The battery pack 100 may be disposed, for example, in a space between a rear seat and a trunk room, a space between a driver's seat and a front passenger seat, and the like.

<Circuit Configuration of Battery Pack>

Next, a circuit configuration of the battery pack 100 will be described. As shown in FIG. 1, the first external connection terminal 100*a* and one end of the first switch 31 are electrically connected to each other through the first power supply busbar 51. A part of the first power supply busbar 51 is branched. A branch part 51*a* of the first power supply busbar 51 is electrically connected to a first internal terminal 26*a* of the wiring board 21.

The other end of the first switch 31 and the second external connection terminal 100*b* are electrically connected to each other through the second power supply busbar 52. A part of the second power supply busbar 52 is branched. The branch part 52*a* of the second power supply busbar 52 is electrically connected to one end of the second switch 32.

A part of the second power supply busbar 52 is branched from a connection part between the other end of the first switch 31 and the branch part 52*a*. The branch part 52*b* is electrically connected to the fourth internal terminal 26*d* of the wiring board 21.

The other end of the second switch 32 and a positive electrode of the assembled battery 10 are electrically connected to each other through the third power supply busbar 53. A part of the third power supply busbar 53 is branched. A branch part 53*a* of the third power supply busbar 53 is electrically connected to the second internal terminal 26*b* of the wiring board 21. A negative electrode of the assembled battery 10 is electrically connected to the third external connection terminal 100*c*.

The first internal terminal 26*a* and the second internal terminal 26*b* of the wiring board 21 are electrically connected to each other through the first power supply line 23. The third switch 33 and the fourth switch 34 are connected in series to the first power supply line 23 in order from the first internal terminal 26*a* to the second internal terminal 26*b*.

The third internal terminal 26*c* and the fourth internal terminal 26*d* of the wiring board 21 are electrically connected to each other through the second power supply line 24. The third internal terminal 26*c* is electrically connected to the fourth external connection terminal 100*d* through the fourth power supply busbar 54.

The sixth switch 36 is provided in the second power supply line 24. A midpoint between the third internal terminal 26*c* and the sixth switch 36 in the second power supply line 24 is connected to a midpoint between the third switch 33 and the fourth switch 34 in the first power supply line 23. As a result, the sixth switch 36 is connected in parallel with the third switch 33.

A midpoint between the fourth internal terminal 26*d* and the sixth switch 36 in the second power supply line 24 is electrically connected to the fifth external connection terminal 100*e* through the third power supply line 25. The fifth switch 35 is provided in the third power supply line 25. As a result, the fifth switch 35 is connected in parallel with the first switch 31.

As described above, the first switch 31, the second switch 32, the fourth switch 34, and the third switch 33 are sequentially connected to each other in a ring shape. The midpoint between the first switch 31 and the second switch 32 is connected to the second external connection terminal 100*b*. The midpoint between the second switch 32 and the fourth switch 34 is connected to the assembled battery 10. The midpoint between the fourth switch 34 and the third switch 33 is connected to the fourth external connection terminal 100*d*. The midpoint between the third switch 33 and the first switch 31 is connected to the first external connection terminal 100*a*.

The midpoint between the first switch 31 and the second switch 32 is connected to the midpoint between the fourth switch 34 and the third switch 33 through the sixth switch 36. The midpoint between the first switch 31 and the second switch 32 is connected to the fifth external connection terminal 100*e* through the fifth switch 35.

With the electrical connection configuration described above, the first switch 31 is controlled to be opened and closed, thereby controlling the electrical connection between the first external connection terminal 100*a* and the second external connection terminal 100*b*. In other words, the electrical connection between the lead storage battery 110 and the rotary electric machine 130 is controlled by controlling the opening and closing of the first switch 31.

The opening and closing of the second switch 32 are controlled so that the electrical connection between the second external connection terminal 100*b* and the assembled battery 10 is controlled. In other words, the electrical connection between the rotary electric machine 130 and the assembled battery 10 is controlled by controlling the opening and closing of the second switch 32.

The electrical connection between the second internal terminal 26*b* and the third internal terminal 26*c* is controlled by controlling the opening and closing of the fourth switch 34. In other words, the electrical connection between the assembled battery 10 and the protective load 152 is controlled by controlling the opening and closing of the fourth switch 34.

The electrical connection between the first internal terminal 26*a* and the third internal terminal 26*c* is controlled by controlling the opening and closing of the third switch 33. In other words, the electrical connection between the lead storage battery 110 and the protective load 152 is controlled by controlling the opening and closing of the third switch 33. Further, the electrical connection between the fourth internal terminal 26*d* and the third internal terminal 26*c* is controlled by controlling the opening and closing of the sixth switch 36. In other words, the electrical connection between the rotary electric machine 130 and the protective load 152 is controlled by controlling the opening and closing of the sixth switch 36.

The electrical connection between the fourth internal terminal 26*d* and the fifth external connection terminal 100*e* is controlled by controlling the opening and closing of the fifth switch 35. In other words, the electrical connection between the rotary electric machine 130 and the lead storage battery 110 is controlled by controlling the opening and closing of the fifth switch 35.

In other words, the fifth switch 35 and the sixth switch 36 are simultaneously controlled to be opened and closed, thereby controlling the electrical connection between the third internal terminal 26*c* and the fifth external connection terminal 100*e*. In other words, the fifth switch 35 and the sixth switch 36 are simultaneously controlled to be opened and closed, thereby controlling the electrical connection between the protective load 152 and the lead storage battery 110.

The connection between each power supply busbar and each switch is performed by Tig welding. The connection between each power supply busbar and the external connection terminal is performed by bolting. The connection between each power supply busbar and the circuit board 20 is performed by soldering.

<Configuration of Battery Module>

In the following description, the three directions orthogonal to each other are referred to as a lateral direction, a longitudinal direction, and a height direction. The lateral direction is along a left-right direction of the vehicle. The height direction is along a top-bottom direction of the vehicle. When the vehicle is stopped on a horizontal plane, the height direction is along the vertical direction. The lateral direction and the longitudinal direction are along the horizontal direction.

Figure 7:
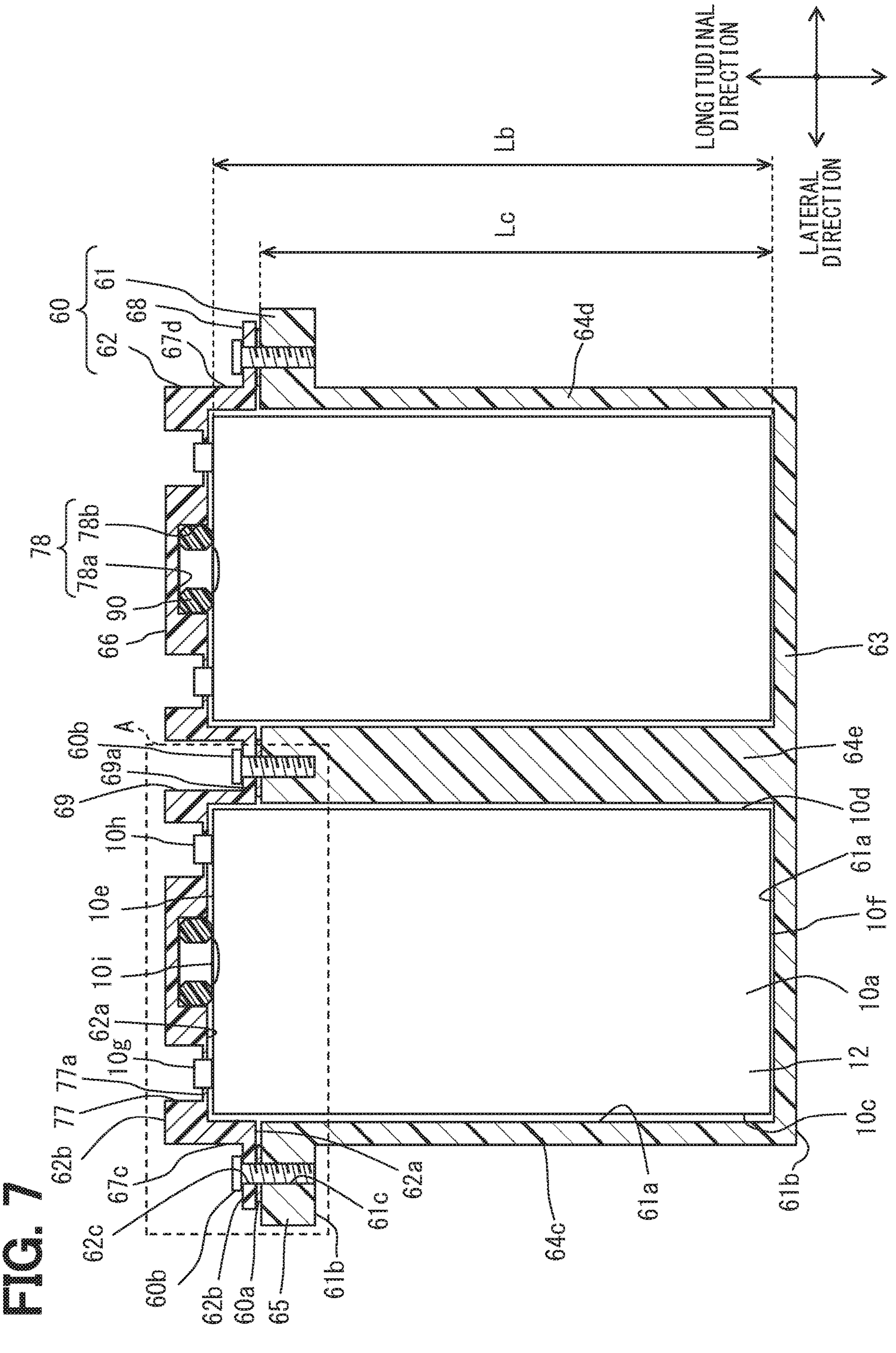
FIG. 7 is a cross-sectional view taken along a line VII-VII shown in FIG. 6.

As described above, the assembled battery 10 has multiple battery cells. The battery cell has a rectangular parallelepiped shape. For that purpose, the battery cell has six sides. As shown in FIG. 2, the battery cell has a first main surface 10*a* and a second main surface 10*b* facing each other in the height direction. The battery cell has a first side surface 10*c* and a second side surface 10*d* facing each other in the lateral direction. As shown in FIG. 7, the battery cell has an upper end surface 10*e* and a lower end surface 10*f* facing each other in the longitudinal direction. Among those six surfaces, the first main surface 10*a* and the second main surface 10*b* are larger in area than the other four surfaces. The battery cell has a flat shape with a small length (thickness) between the first main surface 10*a* and the second main surface 10*b*.

A positive electrode terminal 10*g* and a negative electrode terminal 10*h* as electrode terminals are formed on an upper end surface 10*e* of the battery cell. The positive electrode terminal 10*g* and the negative electrode terminal 10*h* each have a rectangular parallelepiped shape. The positive electrode terminal 10*g* and the negative electrode terminal 10*h* project from the upper end surface 10*e* in the longitudinal direction so as to be separated from the battery cell.

The positive electrode terminal 10*g* and the negative electrode terminal 10*h* are placed apart from each other in the lateral direction. The positive electrode terminal 10*g* is located on the first side surface 10*c* side. The negative electrode terminal 10*h* is located on the second side surface 10*d* side.

As shown in FIGS. 2 and 7, a safety valve 10*i* having a locally low rigidity is formed between the positive electrode terminal 10*g* and the negative electrode terminal 10*h* on the upper end surface 10*e*. As described above, the battery cell expands by the generation of gas. When an internal pressure of the battery cell rises due to the generation of the gas, a crack occurs in the safety valve 10*i*. As a result, the gas of the battery cell is discharged from the safety valve 10*i* to the outside.

As shown in FIGS. 4 and 7, packings 90 are provided in respective regions where the positive electrode terminal 10*g*, the negative electrode terminal 10*h*, and the safety valve 10*i* are not formed on the upper end surface 10*e*. The packings 90 are made of an elastic material such as rubber. The length of the packings 90 in the longitudinal direction is longer than the length of each of the positive electrode terminal 10*g* and the negative electrode terminal 10*h*. The packings 90 are held between the battery cell and the wiring case 62 by the connection between the battery case 61 and the wiring case 62.

The assembled battery 10 according to the present embodiment includes a first battery cell 11, a second battery cell 12, a third battery cell 13, a fourth battery cell 14, and a fifth battery cell 15. A cell stack is formed by placement of the multiple battery cells.

In the present embodiment, a first cell stack 10*l* and a second cell stack 10*m* are configured. The first battery cell 11, the fourth battery cell 14, and the fifth battery cell 15 among the five battery cells are distributed to the first cell stack 10*l*. The remaining second battery cells 12 and third battery cells 13 are distributed to the second cell stack 10*m*.

As shown in FIG. 2, in the first cell stack 10*l*, the first battery cell 11, the fourth battery cell 14, and the fifth battery cell 15 are aligned in order from a bottom wall 83 of the housing 81 toward the cover 82 side in the height direction. In the second cell stack 10*m*, the second battery cell 12 and the third battery cell 13 are aligned in order from the bottom wall 83 toward the cover 82 side in the height direction. Those cell stacks are housed in the battery case 61.

The battery case 61 has a box shape opened in the longitudinal direction. As shown in FIG. 3, the battery case 61 has a bottom wall 63 facing in the longitudinal direction, and a peripheral wall 64 standing in an annular shape in the longitudinal direction from an inner surface 61*a* of the bottom wall 63. An opening window 63*a* is provided in the bottom wall 63 so as to penetrate through the inner surface 61*a* and an outer surface 61*b* on the back side of the inner surface 61*a* in the longitudinal direction. The inside and the outside of the battery case 61 (the module case 60) are communicated with each other through the opening window 63*a*.

The peripheral wall 64 has an upper wall 64*a* and a lower wall 64*b* aligned in the height direction, and a left wall 64*c* and a right wall 64*d* aligned in the lateral direction. The upper wall 64*a*, the right wall 64*d*, the lower wall 64*b*, and the left wall 64*c* are connected to each other in a stated order in the circumferential direction around the longitudinal direction to form an annular shape.

The battery case 61 has a first partition wall 64*e* that divides a region surrounded by the annular peripheral wall 64 into two sub-regions in the lateral direction. The first partition wall 64*e* causes the region surrounded by the peripheral wall 64 of the battery case 61 to be divided into a first stack housing space 64*f* for housing the first cell stack 10*l* and a second stack housing space 64*g* for housing the second cell stack 10*m*.

The battery case 61 further has a second partition wall 64*h* for dividing the stack housing space into individual housing spaces corresponding to the respective battery cells. Two second partition walls 64*h* are provided in the first stack housing space 64*f*. Those two second partition walls 64*h* are aligned to be separated from each other in the first stack housing space 64*f* in the height direction. Those two second partition walls 64*h* connect the first partition wall 64*e* and the right wall 64*d*. As a result, the first stack housing space 64*f* is partitioned into a first housing space 64*i*, a fourth housing space 64*l*, and a fifth housing space 64*m* aligned in order from the lower wall 64*b* toward the upper wall 64*a* in the height direction.

One second partition wall 64*h* is provided in the second stack housing space 64*g*. The one second partition wall 64*h* is located between the upper wall 64*a* and the lower wall 64*b* in the second stack housing space 64*g*. The second partition wall 64*h* connects the left wall 64*c* and the first partition wall 64*e*. As a result, the second stack housing space 64*g* is partitioned into a second housing space 64*j* and a third housing space 64*k* which are aligned in order from the lower wall 64*b* toward the upper wall 64*a* in the height direction.

The first housing space 64*i* and the second housing space 64*j* are aligned in the lateral direction. The fourth housing space 64*l* and the third housing space 64*k* are aligned in the lateral direction. A vacant space for one housing space is defined on the side of the third housing space 64*k* in the lateral direction of the fifth housing space 64*m*. As shown in FIG. 2, at least a part of the circuit board 20 is provided in the vacant space. For that reason, at least a part of the circuit board 20 is laterally aligned with the fifth housing space 64*m*.

Each of those five housing spaces is open in the longitudinal direction. The battery cell is inserted into the opening of the housing space. As shown in FIG. 7, each battery cell is inserted into the corresponding housing space until a lower end surface 10*f* of the battery cell comes into contact with the inner surface 61*a* of the bottom wall 63 of the battery case 61. In this inserted state, the positive electrode terminal 10*g* and the negative electrode terminal 10*h* of each battery cell project out of the housing space. The upper end surface 10*e* of each of the first main surface 10*a*, the second main surface 10*b*, the first side surface 10*c*, and the second side surface 10*d* of the battery cell also protrudes out of the battery case 61.

As shown in FIG. 4, in the first stack housing space 64*f*, the second main surfaces 10*b* of the first battery cell 11 and the fourth battery cell 14 face each other in the height direction. The first main surfaces 10*a* of the fourth battery cell 14 and the fifth battery cell 15 face each other in the height direction. As a result, the positive electrode terminals 10*g* and the negative electrode terminals 10*h* are alternately aligned in the height direction.

In the second stack housing space 64*g*, the second main surfaces 10*b* of the second battery cell 12 and the third battery cell 13 face each other in the height direction. As a result, the positive electrode terminals 10g and the negative electrode terminals 10h are alternately aligned in the height direction.

The positive electrode terminal 10g of the first battery cell 11 and the negative electrode terminal 10h of the second battery cell 12 are placed side by side in the lateral direction. The negative electrode terminal 10h of the fourth battery cell 14 and the positive electrode terminal 10g of the third battery cell 13 are placed side by side in the lateral direction.

In addition to the bottom wall 63 and the peripheral wall 64, the battery case 61 has a first flange portion 65 extending in a direction away from the center of the battery case 61 along a plane defined by a lateral direction and a height direction from a tip of the peripheral wall 64. In FIG. 2, a boundary between the first flange portion 65 and the peripheral wall 64 is indicated by a dashed line. The first flange portion 65 is formed in an annular shape on each of the upper wall 64a, the right wall 64d, the lower wall 64b, and the left wall 64c of the peripheral wall 64.

In the following description, a plane defined by the lateral direction and the height direction is referred to as a defined plane for the sake of simplicity. The direction along the defined plane is denoted as a surface direction.

Multiple first screw holes 61c extending in the longitudinal direction are provided in portions of the first flange portion 65 formed in the right wall 64d and the left wall 64c. The first screw hole 61c is also defined in the first partition wall 64e. Each of the multiple first screw holes 61c is opened in the inner surface 61a of the battery case 61. As shown in FIG. 7, the inner surfaces 61a in which the first screw holes 61c are opened have the same position in the longitudinal direction along the defined plane.

As shown in FIG. 5, the wiring case 62 has a shape extending in the lateral direction. As shown in FIG. 7, a portion of the wiring case 62 facing the battery cell is recessed in a direction away from the battery case 61 in the longitudinal direction. As a result, the wiring case 62 has a box shape opened in the longitudinal direction.

Specifically, the wiring case 62 has a lid wall 66 facing in the longitudinal direction, and an annular wall 67 standing annularly from the lid wall 66. The lid wall 66 is disposed to face the battery cell in the longitudinal direction. The annular wall 67 rises from an edge portion of an inner surface 62a of the lid wall 66 on the battery cell side toward the battery cell side.

The annular wall 67 has an upper wall 67a and a lower wall 67b aligned in the height direction, and a left wall 67c and a right wall 67d aligned in the lateral direction. The upper wall 67a, the right wall 67d, the lower wall 67b, and the left wall 67c are connected to each other in a stated order in the circumferential direction around the longitudinal direction to form an annular shape.

As shown in FIGS. 5 and 6, the wiring case 62 has, in addition to the lid wall 66 and the annular wall 67, a second flange portion 68 extending in a direction away from the center of the wiring case 62 along the defined plane from the tip of the annular wall 67. The second flange portion 68 is formed in each of the upper wall 67a, the right wall 67d, the lower wall 67b, and the left wall 67c of the annular wall 67 to form an annular shape.

Multiple second screw holes 62c extending in the longitudinal direction are defined in portions of the second flange portion 68 formed in the right wall 67d and the left wall 67c. As shown in FIGS. 5 to 7, the second screw hole 62c is defined in a portion of the lid wall 66 facing the first partition wall 64e. Each of the multiple second screw holes 62c is opened to the inner surface 62a and the outer surface 62b of the wiring case 62. As shown in FIG. 7, the inner surfaces 62a in which the multiple second screw holes 62c are opened have the same position in the longitudinal direction along the defined plane.

A first recess portion 69 locally recessed toward the battery case 61 side is provided in a portion of the lid wall 66 facing the first partition wall 64e. A part of the multiple second screw holes 62c is provided in the bottom portion 69a of the first recess portion 69. Lengths (thicknesses) of the bottom portion 69a and the second flange portion 68 in the longitudinal direction are equal to each other. The open outer surfaces 62b of the multiple second screw holes 62c are provided along the defined plane. For that reason, the longitudinal positions of the outer surfaces 62b in which the multiple second screw holes 62c are opened are the same.

The wiring case 62 is provided in the battery case 61 so as to close the opening of the housing space of the battery case 61 and cover a part of the battery cell protruding out of the opening of the battery case 61. With the installation of the wiring case 62 in the battery case 61, the inner surface 61a of the battery case 61 in which the first screw holes 61c are opened and the inner surface 62a of the wiring case 62 in which the second screw holes 62c are opened face each other in the longitudinal direction.

As shown in FIG. 7, a collar 60a is provided between the inner surface 61a and the inner surface 62a in which the screw holes are opened. The collar 60a has a flat shape with a thin length (thickness) in the longitudinal direction. The collar 60a is annular with a gap. The annular portion of the collar 60a is open in the longitudinal direction. The opening of the collar 60a is located between the opening on the inner surface 61a side of the first screw hole 61c and the opening on the inner surface 62a side of the second screw hole 62c.

The screw member 60b shown in FIGS. 6 and 7 is fastened to each of multiple synthetic screw holes defined by aligning the second screw hole 62c, the collar 60a, and the first screw hole 61c in the longitudinal direction. As a result, the battery case 61 and the wiring case 62 are mechanically connected (coupled) to each other so as to approach each other in the longitudinal direction. In this coupling state, the wiring case 62 is housed in a projection plane of the battery case 61 in the longitudinal direction. The screw member 60b corresponds to a coupling portion.

Figure 8:
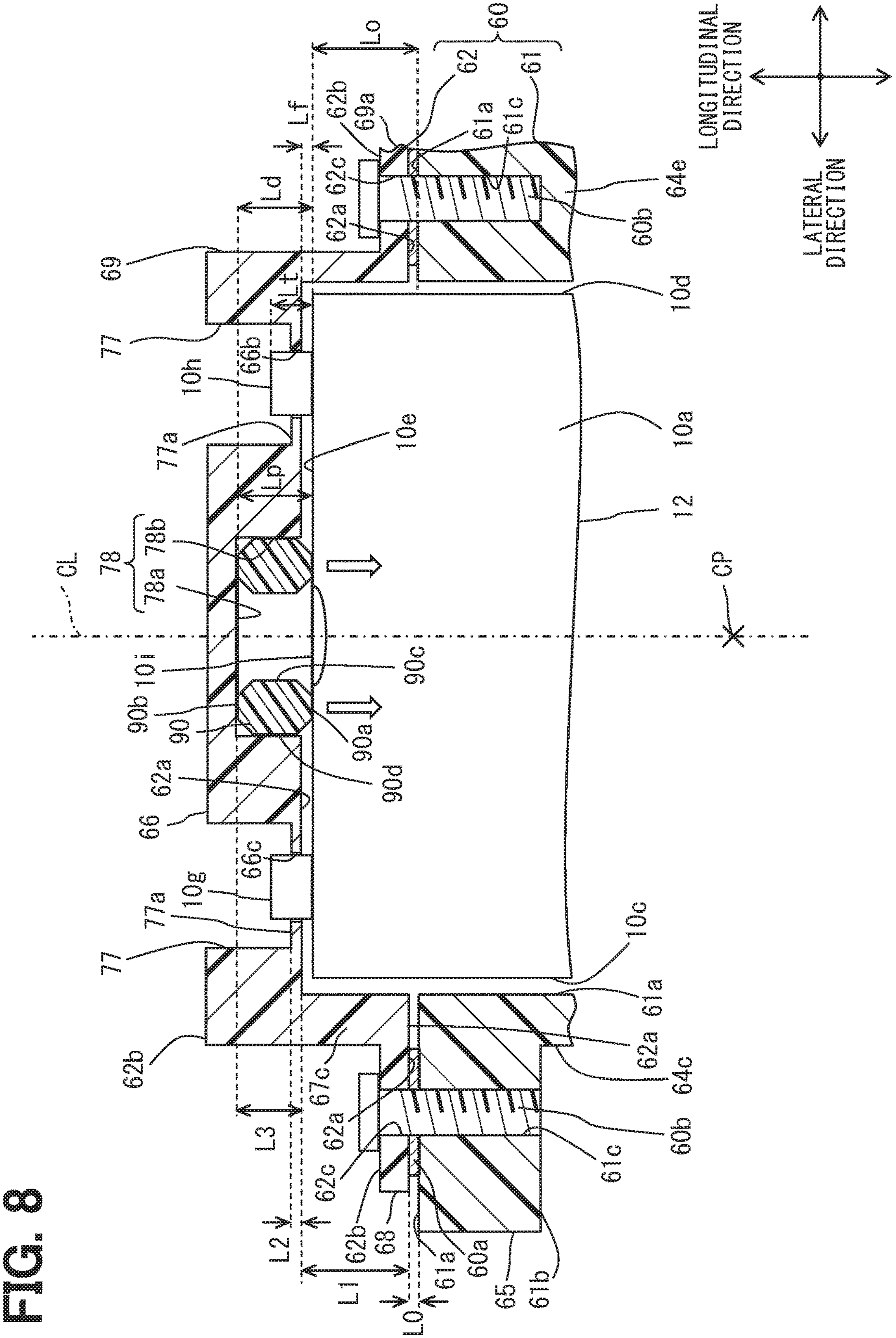
FIG. 8 is an enlarged cross-sectional view of a region A surrounded by a dashed line shown in FIG. 7.

A threaded groove may be defined in at least one of the first screw hole 61c and the second screw hole 62c. In FIGS. 7 and 8, a tip of the screw shaft of the screw member 60b is shown as being housed in the first screw hole 61c, but the tip of the screw shaft may project outward from the opening on the outer surface 61b side of the first screw hole 61c. In this case, a nut is fastened to the tip of the screw shaft.

With the connection of the battery case 61 and the wiring case 62, the packing 90 provided on the upper end surface 10e of the battery cell is compressed in the longitudinal direction between the battery cell and the wiring case 62. As a result, a restoring force is generated in the packing 90 in a direction away from the packing 90 along the longitudinal direction. This restoring force presses the battery cell in the longitudinal direction. The battery cell is held between the packing 90 and the bottom wall 63 of the battery case 61. As a result, displacement and expansion of the battery cell in the longitudinal direction are inhibited.

As described above, the battery cell has the first main surface 10a and the second main surface 10b facing each other in the height direction. The first main surface 10a and the second main surface 10b are larger in area than the other four surfaces. For that reason, the battery cell tends to expand in the height direction. As shown in FIG. 2, a restraining plate 85 for restraining the expansion of the battery cell in the height direction is provided between the upper wall 64*a* of the battery case 61 and the cover 82. The restraining plate 85 is connected to the bottom wall 83 of the housing 81 by bolts or the like. As a result, the module case 60 housing the assembled battery 10 is provided between the restraining plate 85 and the bottom wall 83. The restraining plate 85 and the bottom wall 83 restrain the battery module in which the assembled battery 10 is housed in the module case 60 from expanding in the height direction.

As shown in FIG. 5, the lid wall 66 of the wiring case 62 is formed with multiple openings for electrically connecting the first battery cell 11 to the fifth battery cell 15 to the coupling busbar 70. The multiple openings penetrate longitudinally through the lid wall 66. The opening opens into the inner surface 62*a* and the outer surface 62*b* of the lid wall 66.

The lid wall 66 is formed with a first opening 66*a*, a second opening 66*b*, a third opening 66*c*, a fourth opening 66*d*, a fifth opening 66*e*, and a sixth opening 66*f* as openings. The first opening 66*a* and the sixth opening 66*f* are provided in the lid wall 66 corresponding to the positive electrode terminal 10*g* and the negative electrode terminal 10*h* which function as the output of the assembled battery 10. The second opening 66*b* to the fifth opening 66*e* are provided in the lid wall 66 corresponding to the positive electrode terminal 10*g* and the negative electrode terminal 10*h* related to the electrical series connection of the multiple battery cells.

In a state in which the wiring case 62 is connected to the battery case 61, the first opening 66*a* is provided in a portion of the lid wall 66 which faces the negative electrode terminal 10*h* of the first battery cell 11 in the longitudinal direction. The second opening 66*b* is provided at a portion of the lid wall 66 which faces the positive electrode terminal 10*g* of the first battery cell 11 in the longitudinal direction, and at a portion of the lid wall 66 which faces the negative electrode terminal 10*h* of the second battery cell 12 in the longitudinal direction.

The third opening 66*c* is provided at a portion of the lid wall 66 which faces the positive electrode terminal 10*g* of the second battery cell 12 in the longitudinal direction, and at a portion of the lid wall 66 which faces the negative electrode terminal 10*h* of the third battery cell 13 in the longitudinal direction. The fourth opening 66*d* is provided at a portion of the lid wall 66 which faces the positive electrode terminal 10*g* of the third battery cell 13 in the longitudinal direction, and at a portion of the lid wall 66 which faces the negative electrode terminal 10*h* of the fourth battery cell 14 in the longitudinal direction.

The fifth opening 66*e* is provided at a portion of the lid wall 66 which faces the positive electrode terminal 10*g* of the fourth battery cell 14 in the longitudinal direction, and at a portion of the lid wall 66 which faces the negative electrode terminal 10*h* of the fifth battery cell 15 in the longitudinal direction. The sixth opening 66*f* is provided in a portion of the lid wall 66 which faces the positive electrode terminal 10*g* of the fifth battery cell 15 in the longitudinal direction.

The coupling busbar 70 includes a first coupling busbar 71, a second coupling busbar 72, a third coupling busbar 73, a fourth coupling busbar 74, a fifth coupling busbar 75, and a sixth coupling busbar 76. The first coupling busbar 71 to the sixth coupling busbar 76 are provided on the outer surface 62*b* of the lid wall 66 as shown in FIG. 6. A part of each busbar is provided in the corresponding opening.

The lid wall 66 is formed with multiple second recess portions 77 locally recessed toward the battery case 61 in correspondence with the coupling busbar 70. The first opening 66*a* to sixth opening 66*f* are provided in respective bottom portions 77*a* of the multiple second recess portions 77. As shown in FIG. 7, the bottom portion 77*a* is separated from the battery case 61 by a length of the annular wall 67 in the longitudinal direction from each of the second flange portion 68 and the bottom portion 69*a* of the first recess portion 69.

A length of the bottom portion 77*a* in the longitudinal direction is shorter than the length of each of the positive electrode terminal 10*g* and the negative electrode terminal 10*h* in the longitudinal direction. For that reason, the length of each opening in the longitudinal direction is also shorter than the length of each of the positive electrode terminal 10*g* and the negative electrode terminal 10*h* in the longitudinal direction. The positive electrode terminal 10*g* and the negative electrode terminal 10*h* are exposed to the outside of the module case 60 through the respective openings.

The first coupling busbar 71 is provided on the outer surface 62*b* side of the second recess portion 77 in such a manner as to close the first opening 66*a*. A portion of the first coupling busbar 71 provided in the first opening 66*a* is mechanically and electrically connected to the negative electrode terminal 10*h* of the first battery cell 11 by laser welding or the like. The first coupling busbar 71 is connected to the ground potential.

A negative connection terminal (not shown) is formed on the first coupling busbar 71. The negative connection terminal functions as a negative output terminal of the assembled battery 10.

The second coupling busbar 72 is provided on the outer surface 62*b* side of the second recess portion 77 in such a manner as to close the second opening 66*b*. The second coupling busbar 72 has a laterally extending shape. A portion of the second coupling busbar 72 provided in the second opening 66*b* is mechanically and electrically connected to each of the positive electrode terminal 10*g* of the first battery cell 11 and the negative electrode terminal 10*h* of the second battery cell 12 by laser welding or the like. As a result, the first battery cell 11 and the second battery cell 12 are connected in series with each other through the second coupling busbar 72.

The third coupling busbar 73 is provided on the outer surface 62*b* side of the second recess portion 77 in such a manner as to close the third opening 66*c*. The third coupling busbar 73 has a shape extending in the height direction. A portion of the third coupling busbar 73 provided in the third opening 66*c* is mechanically and electrically connected to each of the positive electrode terminal 10*g* of the second battery cell 12 and the negative electrode terminal 10*h* of the third battery cell 13 by laser welding or the like. As a result, the second battery cell 12 and the third battery cell 13 are connected in series with each other through the third coupling busbar 73.

The fourth coupling busbar 74 is provided on the outer surface 62*b* side of the second recess portion 77 in such a manner as to close the fourth opening 66*d*. The fourth coupling busbar 74 has a laterally extending shape. A portion of the fourth coupling busbar 74 provided in the fourth opening 66*d* is mechanically and electrically connected to each of the positive electrode terminal 10*g* of the third battery cell 13 and the negative electrode terminal 10*h* of the fourth battery cell 14 by laser welding or the like. As a result, the third battery cell 13 and the fourth battery cell 14 are connected in series with each other through the fourth coupling busbar 74.

The fifth coupling busbar 75 is provided on the outer surface 62*b* side of the second recess portion 77 in such a manner as to close the fifth opening 66*e*. The fifth coupling busbar 75 has a shape extending in the height direction. A portion of the fifth coupling busbar 75 provided in the fifth opening 66*e* is mechanically and electrically connected to the positive electrode terminal 10*g* of the fourth battery cell 14 and the negative electrode terminal 10*h* of the fifth battery cell 15 by laser welding or the like. As a result, the fourth battery cell 14 and the fifth battery cell 15 are connected in series with each other through the fifth coupling busbar 75.

The sixth coupling busbar 76 is provided on the outer surface 62*b* side of the second recess portion 77 in such a manner as to close the sixth opening 66*f*. A portion of the sixth coupling busbar 76 provided in the sixth opening 66*f* is mechanically and electrically connected to the positive electrode terminal 10*g* of the fifth battery cell 15 by laser welding or the like.

A positive connection terminal (not shown) is formed on the sixth coupling busbar 76. The positive connection terminal functions as a positive output terminal of the assembled battery 10.

<Internal Configuration of Battery Module>

Next, an internal configuration of the battery module will be described in detail with reference to FIGS. 7 to 9. However, in FIGS. 7 and 8, the coupling busbar 70 is not shown.

As described above, the first screw hole 61*c* is opened in the inner surface 61*a* of each of the first flange portion 65 and the first partition wall 64*e* of the battery case 61. The longitudinal positions of the inner surfaces 61*a* in which the multiple first screw holes 61*c* are opened are the same. As shown in FIG. 7, a length in the longitudinal direction between the inner surface 61*a* in which the first screw hole 61*c* is opened and the inner surface 61*a* of the bottom wall 63 is Lc.

The battery cell is inserted into the housing space of the battery case 61 until the lower end surface 10*f* comes into contact with the inner surface 61*a* of the bottom wall 63 of the battery case 61. In this inserted state, the upper end surface 10*e* side of each battery cell protrudes out of the housing space. As shown in FIG. 7, when a length between the upper end surface 10*e* and the lower end surface 10*f* of the battery cell is Lb, a longitudinal length of the portion of the battery cell protruding out of the battery case 61 on the upper end surface 10*e* side of the battery cell is Lb-Lc. Hereinafter, the longitudinal length Lb-Lc of the battery cell protruding from the battery case 61 is denoted as a protrusion length Lo as shown in FIG. 8.

The protrusion length Lo changes depending on a manufacturing error of the longitudinal length of each of the battery cell and the battery case 61, surface irregularities of the contact surface, and the like. Therefore, the protrusion length Lo of each of the multiple battery cells is different.

As described above, each of the second flange portion 68 of the wiring case 62 and the bottom portion 69*a* of the first recess portion 69 of the lid wall 66 is provided with the second screw hole 62*c*. The longitudinal positions of the inner surfaces 62*a* in which the multiple second screw holes 62*c* are opened are the same. As shown in FIG. 8, a longitudinal length between the inner surface 62*a* in which the second screw hole 62*c* is opened and the inner surface 62*a* of the lid wall 66 which is separated from the inner surface 62*a* by a length of the above-mentioned annular wall 67 in which the second screw hole 62*c* is opened in the longitudinal direction is L1.

The wiring case 62 is connected to the battery case 61 by the screw member 60*b*. In the above connected state, the inner surface 61*a* of the battery case 61 in which the first screw hole 61*c* is opened and the inner surface 62*a* of the wiring case 62 in which the second screw hole 62*c* is opened face each other in the longitudinal direction through the collar 60*a*. The inner surface 61*a* in which the first screw hole 61*c* is opened and the inner surface 62*a* in which the second screw hole 62*c* is opened are in contact with the collar 60*a*. As shown in FIG. 8, a thickness of the collar 60*a* in the longitudinal direction is L0.

As described above, in the above connected state, the inner surface 62*a* of the lid wall 66 and the inner surface 61*a* in which the first screw hole 61*c* is opened are separated from each other by L0+L1 in the longitudinal direction. The separation distance L0+L1 is set to be longer than the protrusion length Lo of the battery cell.

As described above, the protrusion length Lo changes due to a manufacturing error, surface irregularities, and the like. If the protrusion length Lo becomes longer due to the manufacturing errors and the surface irregularities, a difference from the separation distance L0+L1 becomes shorter. On the contrary, when the protrusion length Lo becomes shorter, the difference from the separation distance L0+L1 becomes longer. In the following description, in order to simplify the notation, a difference between the protrusion length Lo and the separation distance L0+L1 is indicated as an opposing distance Lf between the inner surface 62*a* of the lid wall 66 and the upper end surface 10*e* of the battery cell.

The second recess portion 77 is provided in the lid wall 66. The first opening 66*a* to the sixth opening 66*f* are provided in the bottom portion 77*a* of the second recess portion 77. Those openings are opened into the inner surface 62*a* of the bottom portion 77*a*. The longitudinal positions of the inner surface 62*a* of the bottom portion 77*a* and the inner surface 62*a* of the lid wall 66 coincide with each other. Therefore, the inner surface 62*a* of the bottom portion 77*a* in which the first opening 66*a* to the sixth opening 66*f* are opened, and the upper end surface 10*e* on which the positive electrode terminal 10*g* and the negative electrode terminal 10*h* are formed are separated from each other by the opposing distance Lf in the longitudinal direction.

A length (thickness) of the bottom portion 77*a* in the longitudinal direction is L2. Therefore, the longitudinal length of each of the first opening 66*a* to the sixth opening 66*f* formed in the bottom portion 77*a* is also L2. As a result, the outer surface 62*b* of the bottom portion 77*a* in which the first opening 66*a* to the sixth opening 66*f* are opened, and the upper end surface 10*e* on which the positive electrode terminal 10*g* and the negative electrode terminal 10*h* are formed are separated from each other by Lf+L2 in the longitudinal direction.

The longitudinal length (terminal length) Lt of each of the positive electrode terminal 10*g* and the negative electrode terminal 10*h* is set to be longer than the separation distance Lf+L2. As a result, the tip end surfaces of the positive electrode terminal 10*g* and the negative electrode terminal 10*h* project outward from the opening of the outer surface 62*b* of the first opening 66*a* to the sixth opening 66*f*.

As described above, the protrusion length Lo varies due to the manufacturing error, the surface irregularities, and the like. For that reason, the opposing distance Lf also varies. As the opposing distance Lf becomes longer, the difference from the terminal length Lt becomes shorter. The protrusion length of the electrode terminal from the opening is shortened. On the contrary, when the opposing distance Lf becomes shorter, the difference from the terminal length Lt becomes longer. The protrusion length of the electrode terminal from the opening is increased. A difference between the opposing distance Lf and the terminal length Lt is different among the multiple battery cells.

<Displacement of Packing>

As described above, the opposing distances Lf between the battery cells and the wiring case 62 are different among the multiple battery cells due to the manufacturing error, the surface irregularities, and the like. In order to absorb such variations and to fix the battery cells to the module case 60, the packing 90 is leveraged.

The packing 90 is provided between the upper end surface 10*e* of the battery cell and the lid wall 66 of the wiring case 62. The packing 90 is held between the upper end surface 10*e* of the battery cell and the lid wall 66 by screwing the battery case 61 and the wiring case 62. The packing 90 is compressed in the longitudinal direction in accordance with a variation in the opposing distance Lf of each of the battery cells. The packing 90 is elastically deformed by the above compression. The length Lp of the packing 90 in the longitudinal direction is shortened, and the length in the surface direction is lengthened. The packing 90 tends to be displaced in the surface direction. In other words, the packing 90 tends to be displaced in the direction along the upper end surface 10*e*. The upper end surface 10*e* corresponds to one surface.

Figure 10:
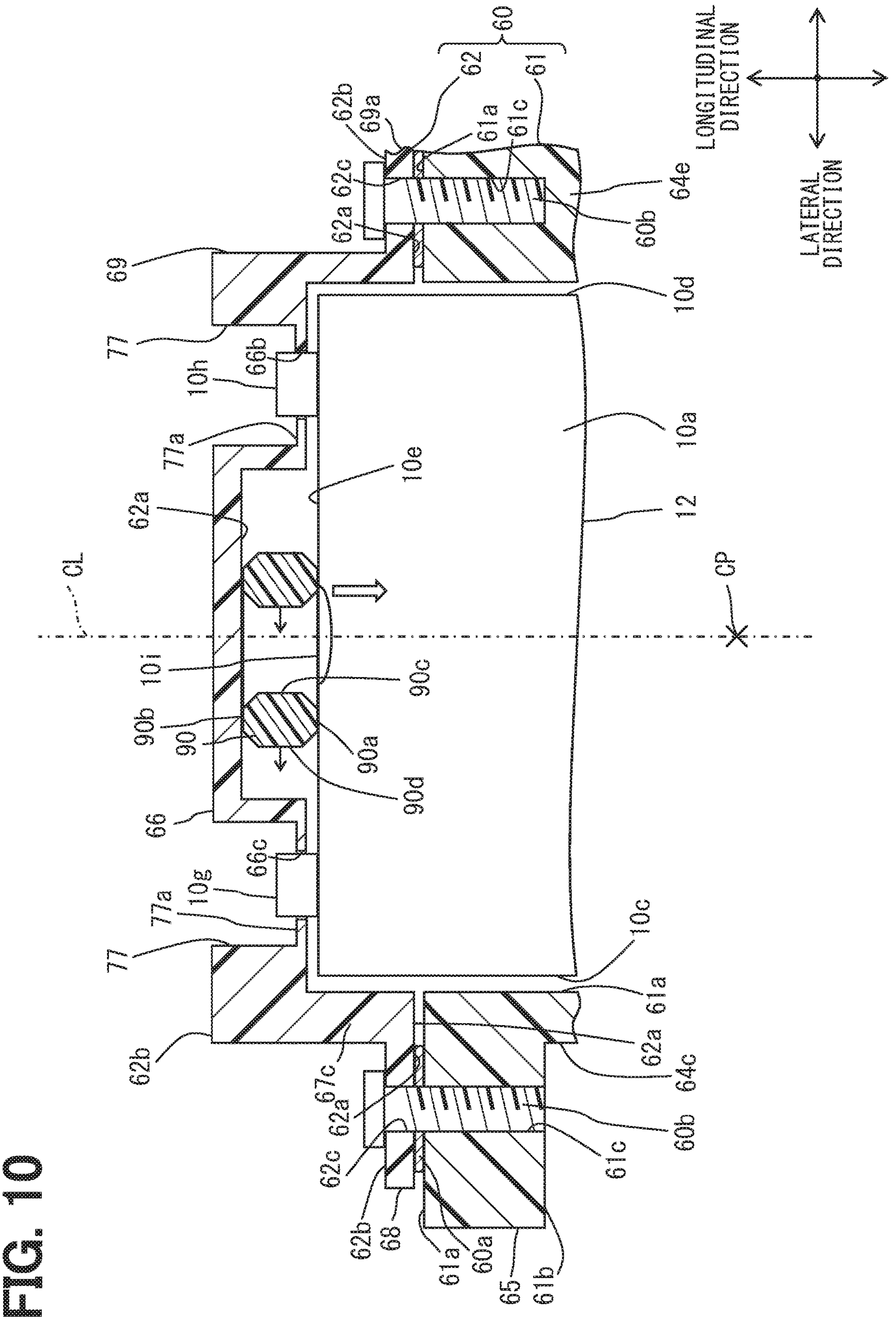
FIG. 10 is a cross-sectional view illustrating a comparison configuration.

As described above, the safety valve 10*i* is formed on the upper end surface 10*e*. The safety valve 10*i* is locally low in rigidity so that cracking occurs when the internal pressure of the battery cell rises due to the generation of gas. Therefore, the packing 90 may come into contact with the safety valve 10*i* as shown in FIG. 10, for example, due to the displacement of the packing 90 in the direction along the upper end surface 10*e* due to the compression described above. As a result, there is a fear that a restoring force of the packing 90 indicated by a white arrow may act on the safety valve 10*i* having a locally low rigidity. As a result, there is a fear that cracks tend to occur in the safety valve 10*i*, and a gas is hardly discharged from the battery cell due to the pressure on the safety valve 10*i*. In this case, the internal pressure of the battery cell may deviate from the setting.

<Regulation Member>

A regulation member 78 for regulating the displacement of the packing 90 at the upper end surface 10*e* is formed in the wiring case 62. Specifically, the regulation member 78 according to the present embodiment is a recess portion locally recessed in a direction away from the battery case 61 in the opposing portion of the lid wall 66 to the battery cell. The regulation member 78 is opposed to each of the safety valve 10*i* and the packing 90 in the longitudinal direction. The regulation member 78 is in contact with the packing 90 while facing the packing 90 in the surface direction.

Figure 9:
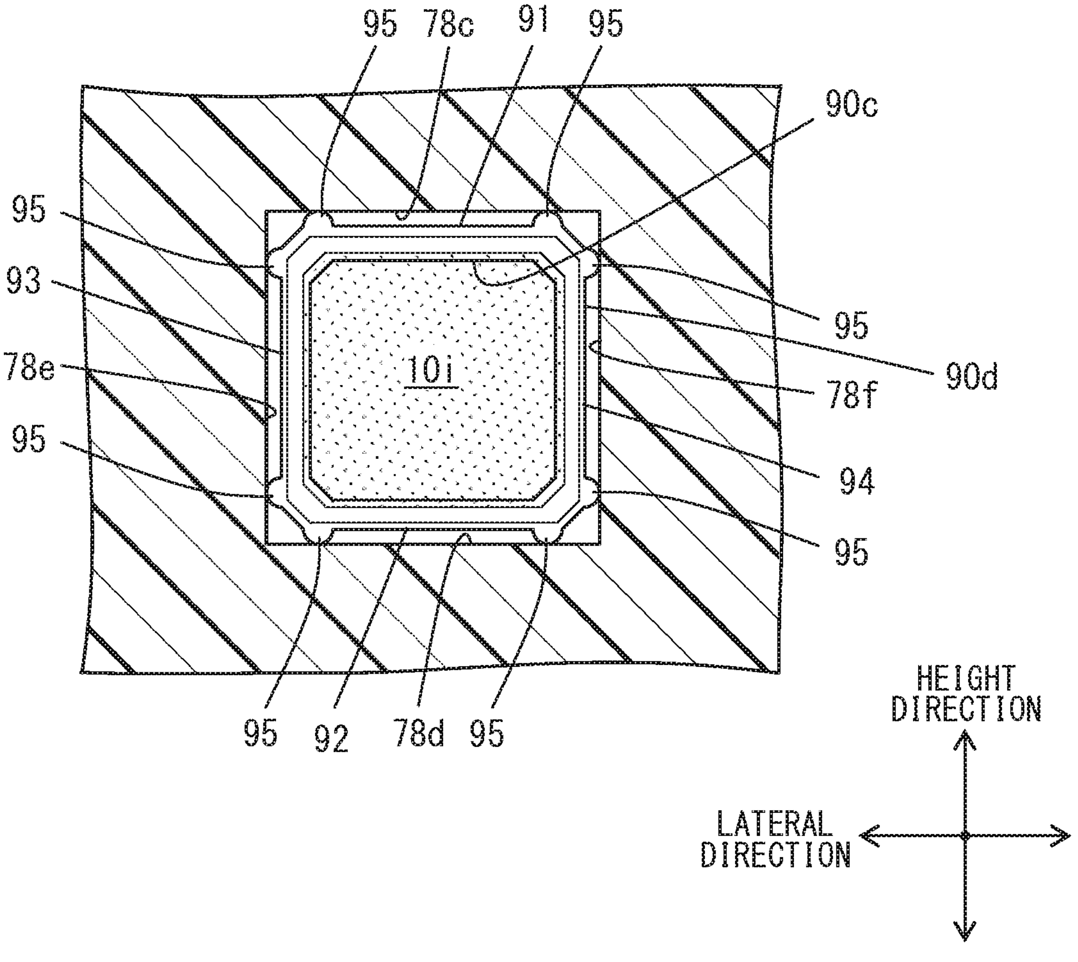
FIG. 9 is a cross-sectional view illustrating a packing and a regulation member according to a first embodiment.

As shown in FIGS. 8 and 9, the regulation member 78 has a pressing surface 78*a* facing in the longitudinal direction and an annular regulation surface 78*b* extending from the pressing surface 78*a* toward the battery case 61. The pressing surface 78*a* has a rectangular shape in the defined plane. A part of the pressing surface 78*a* faces the safety valve 10*i* and the packing 90 in the longitudinal direction. The regulation surface 78*b* has a first lateral surface 78*c* and a second lateral surface 78*d* along the lateral direction and the longitudinal direction, and a first height surface 78*e* and a second height surface 78*f* along the height direction and the longitudinal direction. The first lateral surface 78*c*, the second height surface 78*f*, the second lateral surface 78*d*, and the first height surface 78*e* are aligned in a stated order in the circumferential direction around the longitudinal direction, and the end sides of those surfaces are connected to each other. As a result, the regulation surface 78*b* has a rectangular annular shape in the defined plane. The pressing surface 78*a* corresponds to the facing surface.

As shown in FIG. 8, a length of the regulation surface 78*b* in the longitudinal direction is L3. For that reason, the pressing surface 78*a* and the inner surface 62*a* of the lid wall 66 are separated from each other by the distance L3 in the longitudinal direction. As described above, the inner surface 62*a* of the lid wall 66 and the upper end surface 10*e* of the battery cell are separated from each other by the opposing distance Lf. For that reason, the pressing surface 78*a* and the upper end surface 10*e* are separated from each other by L3+Lf in the longitudinal direction. In the following description, for the sake of simplicity, L3+Lf is denoted as a separation distance Ld.

As described above, the opposing distance Lf varies. For that reason, the separation distance Ld between the pressing surface 78*a* and the upper end surface 10*e* in the longitudinal direction also varies. The separation distance Ld is different among the multiple battery cells. The length Lp of the packing 90 in the uncompressed state in the longitudinal direction is set to be longer than the separation distance Ld. The packing 90 is provided between the pressing surface 78*a* and the upper end surface 10*e* in a manner to be in contact with each other.

<Shape of Packing>

As shown in FIGS. 8 and 9, the packing 90 has an annular shape penetrating in the longitudinal direction. The packing 90 has a first end surface 90*a* which comes annularly in contact with the upper end surface 10*e*, and a second end surface 90*b* which longitudinally faces the first end surface 90*a* and comes annularly in contact with the pressing surface 78*a*. The packing 90 has an inner side surface 90*c* and an outer side surface 90*d* connecting the first end surface 90*a* and the second end surface 90*b*. The inner side surface 90*c* and the outer side surface 90*d* each form an annular shape. The outer side surface 90*d* is located outside the center of the packing 90 more than the inner side surface 90*c*. In the present embodiment, a part of the outer side surface 90*d* and the regulation surface 78*b* are in contact with each other in the surface direction. The packing 90 corresponds to an elastic member.

The packing 90 has a first lateral extension portion 91 and a second lateral extension portion 92 extending in the lateral direction, and a first height extension portion 93 and a second height extension portion 94 extending in the height direction. The first lateral extension portion 91 and the second lateral extension portion 92 are separately opposed to each other in the height direction. The first height extension portion 93 and the second height extension portion 94 are separately opposed to each other in the lateral direction. The first lateral extension portion 91, the second height extension portion 94, the second lateral extension portion 92, and the first height extension portion 93 are aligned in a stated order in the circumferential direction around the longitudinal direction, and end portions of the adjacent extension portions are integrally connected to each other. As a result, the packing 90 forms an annular shape in the defined plane.

As shown in FIG. 9, a portion of the outer side surface 90*d* of each of the four extension portions projects away from the center of the packing 90. As a result, the shapes of the outer side surface 90*d* and the regulation surface 78*b* facing each other in the surface direction are different from each other.

Each of the four extension portions is formed with projection portions 95 that locally project in a direction away from the center of the packing 90 along the surface direction.

The projection portions 95 are formed at both end portions of each of the four extension portions. The projection portions 95 formed at both end portions of the lateral extension portion are aligned so as to be spaced apart from each other in the lateral direction. The projection portions 95 formed at both end portions of the height extension portion are aligned so as to be spaced apart from each other in the height direction. The projection portions 95 formed on the first lateral extension portion 91 and the projection portions 95 formed on the second lateral extension portion 92 are aligned to be apart from each other in the height direction. The projection portion 95 formed on the first height extension portion 93 and the projection portion 95 formed on the second height extension portion 94 are aligned to be apart from each other in the lateral direction.

Before the wiring case 62 is connected to the battery case 61, the packing 90 is provided in the wiring case 62 in advance. The packing 90 provided in the wiring case 62 is in an uncompressed state. In an uncompressed state of the packing 90, the tip end surfaces of the outer side surfaces 90*d* of the multiple projection portions 95 come in contact with the regulation surface 78*b*. As a result, a gap is defined between the outer side surface 90*d* of portions (central portion) in which the projection portions 95 are not provided in each of the four extension portions and the regulation surface 78*b* facing the outer side surface 90*d*.

The central portion of each of the four extension portions has a shorter length between the inner side surface 90*c* and the outer side surface 90*d* than the end portions at which the projection portions 95 are provided. In other words, the thickness of the central portion in the defined plane is smaller than that of the end portions. For that reason, the central portion is more easily elastically deformed than the end portions. The central portion is out of contact with the regulation surface 78*b*. For that reason, the central portion is more easily displaced than the end portions.

As described above, a gap is defined between the regulation surface 78*b* and the central portion, which is more easily elastically deformed and also more easily displaced than the end portions. Therefore, when the packing 90 is compressed by the connection between the battery case 61 and the wiring case 62, the central portion of the packing 90 is easily displaced to the gap.

As shown in FIG. 8, a cross-sectional shape orthogonal to a direction along which each extension portion configuring the packing 90 extends is a polygon. In other words, the cross-sectional shape of the first lateral extension portion 91 and the second lateral extension portion 92 extending in the lateral direction orthogonal to each other is a polygon. A cross-sectional shape orthogonal to the height direction of the first height extension portion 93 and the second height extension portion 94 extending in the height direction is a polygon.

More specifically, the cross-sectional shape orthogonal to the direction along which each extension portion of the packing 90 extends is octagonal. Each of the first end surface 90*a* and the second end surface 90*b* forms one side of an octagon and faces each other in the longitudinal direction. The inner side surface 90*c* and the outer side surface 90*d* each form three sides of an octagon, and are opposed to each other in the lateral direction and the height direction. The inner side surface 90*c* is positioned closer to the center of the packing 90 than the first end surface 90*a* and the second end surface 90*b*. The outer side surface 90*d* is away from the center of the packing 90 more than the first end surface 90*a* and the second end surface 90*b*.

As described above, an intermediate portion of the packing 90 having the inner side surface 90*c* and the outer side surface 90*d* has a shape longer than the first end surface 90*a* and the second end surface 90*b* on the center side and the opposite side of the packing 90. For that reason, the cross-sectional area of the intermediate portion of the packing 90 in the surface direction is larger than the surface area of each of the first end surface 90*a* and the second end surface 90*b*. In other words, the cross-sectional area of the intermediate portion of the packing 90 in the surface direction is larger than a contact area of the first end surface 90*a* with the upper end surface 10*e* and a contact area of the second end surface 90*b* with the pressing surface 78*a*.

As described above, the first end surface 90*a* of the packing 90 comes in annular contact with the upper end surface 10*e*. The safety valve 10*i* is located in an inner region surrounded by a region of the upper end surface 10*e*, which comes in contact with the first end surface 90*a*. In FIG. 9, a region in which the safety valve 10*i* is formed is indicated by hatching. The region in the safety valve 10*i* is formed and the inner side surface 90*c* of the packing 90 are separately opposed to each other in the longitudinal direction. However, the first end surface 90*a* of the packing 90 is separated from the region in which the safety valve 10*i* is formed in the surface direction.

A center line CL passing through the center CP of the battery cell in the longitudinal direction is indicated by a one-dot chain line in FIG. 8. The center line CL passes through a region in which the safety valve 10*i* is formed. More specifically, the center line CL passes through the center of the region in which the safety valve 10*i* is formed.

The center line CL passes through a region surrounded by the inner side surface 90*c* forming the annular shape of the packing 90. For that reason, the first lateral extension portion 91 and the second lateral extension portion 92 of the packing 90 are located on the first direction side and the second direction side, respectively, which are separated from each other in the height direction from the center line CL. The first height extension portion 93 and the second height extension portion 94 of the packing 90 are located on the third direction side and the fourth direction side, respectively, which are separated from the center line CL in the lateral direction. Briefly, the first lateral extension portion 91 and the second lateral extension portion 92 of the packing 90 are aligned in the height direction through the center line CL. The first height extension portion 93 and the second height extension portion 94 are aligned through the center line CL in the lateral direction.

In the present embodiment, the center line CL passes through the center of the packing 90. For that reason, a separation distance between the first lateral extension portion 91 and the second lateral extension portion 92 from the center line CL is the same. The first height extension portion 93 and the second height extension portion 94 are separated from the center line CL by the same separation distance.

As a result, as indicated by outlined arrows in FIG. 8, the restoring force acting on the battery cell from the first height extension portion 93 and the restoring force acting on the battery cell from the second height extension portion 94 are aligned in the lateral direction through the center line CL. The restoring force acting on the battery cell from the first lateral extension portion 91 and the restoring force acting on the battery cell from the second lateral extension portion 92 are aligned in the height direction through the center line CL. The separation distances of those restoring forces from the center line CL are the same.

<Operational Effects>

As described above, with the connection between the battery case 61 and the wiring case 62, the packing 90 comes in contact with the battery cell and the wiring case 62, and is held between the battery cell and the wiring case 62. The regulation member 78 formed on the wiring case 62 regulates the movement of the packing 90 in the direction along the upper end surface 10*e* (in the surface direction). As a result, a contact of the packing 90 with the safety valve 10*i* is inhibited.

According to the above configuration, an increase in the number of components is inhibited, as compared with a configuration in which the contact of the packing with the safety valve is inhibited in the wiring case, and the contact of the packing with the battery cell and the wiring case is made in a different case from the wiring case.

The multiple projection portions 95 are provided on the outer side surface 90*d* of the packing 90. The shapes of the outer side surface 90*d* and the regulation surface 78*b* facing each other in the surface direction are different from each other. In the non-compressed state of the packing 90, the outer side surface 90*d* of the projection portion 95 of the packing 90 and the regulation surface 78*b* are in contact with each other. A gap is defined between the outer side surface 90*d* of the non-molded portion (central portion) of the projection portion 95 of the packing 90 and the regulation surface 78*b* facing the outer side surface 90*d*.

As a result, even if the packing 90 is elastically deformed in the direction along the upper end surface 10*e* by the connection between the battery case 61 and the wiring case 62, the elastically deformed portion of the packing 90 can be released to the gap described above. The packing 90 can be elastically deformed in a direction away from the safety valve 10*i*. For that reason, the packing 90 is restricted from coming into contact with the safety valve 10*i*.

The central portion of the packing 90 is thinner than the end portions where the projection portions 95 are formed. For that reason, the central portion is more easily elastically deformed than the end portions. The central portion is out of contact with the regulation surface 78*b*. For that reason, the central portion is more easily displaced than the end portions. As described above, the gap is defined between the central portion and the regulation surface 78*b*. Therefore, the central portion of the packing 90 elastically deformed in the surface direction by compression can be positively displaced to the gap described above.

The packing 90 is provided on the wiring case 62 in advance before the wiring case 62 is connected to the battery case 61. When the packing 90 is provided in the wiring case 62 in this manner, the packing 90 and the wiring case 62 are in partial contact with each other. For that reason, the packing 90 can be easily attached to the wiring case 62. In addition, the packing 90 is inhibited from falling off from the wiring case 62.

The projection portions 95 are formed at both end portions of each of the four extension portions of the packing 90, and the projection portions 95 formed at both ends are aligned. The projection portions 95 formed in the lateral extension portion are aligned apart from each other in the height direction, and the projection portions 95 formed in the height extension portion are aligned apart from each other in the lateral direction. Each of those eight projection portions 95 is in contact with the regulation surface 78*b*.

According to the above configuration, for example, unlike the configuration in which the projection portion 95 is formed only in one of the four extension portions and only the projection portion 95 comes in contact with the regulation surface 78*b*, the positional deviation of the packing 90 is inhibited. In other words, the displacement of the packing 90 in the surface direction is inhibited.

The regulation member 78 is opposed to the safety valve 10*i* in the longitudinal direction, and is recessed in the direction away from the battery case 61. As a result, the contact between the regulation member 78 and the safety valve 10*i* is inhibited.

The cross-sectional area of the intermediate portion of the packing 90 in the surface direction is larger than the contact area of the first end surface 90*a* with the upper end surface 10*e*. This makes it possible to increase a length of the defined plane of the packing 90 while reducing the contact area with the upper end surface 10*e* of the packing 90. For that reason, the contact between the packing 90 and the safety valve 10*i* is inhibited. At the same time, the reduction of the restoring force of the packing 90 is inhibited. In other words, a decrease in the load acting on the battery cell from the packing 90 is inhibited. As a result, the battery cells are inhibited from being displaced in the module case 60.

The region in which the safety valve 10*i* is formed and the inner side surface 90*c* of the packing 90 are separately opposed to each other in the longitudinal direction. This makes it possible to inhibit the contact between the packing 90 and the safety valve 10*i* while inhibiting the increase in a body size of the packing 90.

The center line CL that penetrates through the center CP of the battery cell in the longitudinal direction passes through a region in which the safety valve 10*i* is formed and a region surrounded by an inner side surface 90*c* that forms the annular shape of the packing 90. For that reason, the first lateral extension portion 91 and the second lateral extension portion 92 of the packing 90 are aligned in the height direction through the center line CL. The first height extension portion 93 and the second height extension portion 94 are aligned through the center line CL in the lateral direction.

For that reason, the restoring force acting on the battery cell from the first lateral extension portion 91 and the restoring force acting on the battery cell from the second lateral extension portion 92 are aligned in the height direction through the center line CL. In the same manner, the restoring force acting on the battery cell from the first height extension portion 93 and the restoring force acting on the battery cell from the second height extension portion 94 are aligned in the lateral direction through the center line CL.

As described above, a rotational moment generated in the center CP of the battery cell by the restoring force acting on the battery cell from the first lateral extension portion 91 and a rotational moment generated in the center CP of the battery cell by the restoring force acting on the battery cell from the second lateral extension portion 92 cancel each other. In the same manner, a rotational moment generated at the center CP of the battery cell by the restoring force acting on the battery cell from the first height extension portion 93 and a rotational moment generated at the center CP of the battery cell by the restoring force acting on the battery cell from the second height extension portion 94 cancel each other out. For that reason, a positional deviation of the battery cells in the module case 60 is inhibited. As a result, a stress is inhibited from acting on the electrical connection portion between the battery cell and the coupling busbar 70. The electrical connection failure between the battery cells is inhibited from occurring.

Further, in the present embodiment, the center line CL passes through the center of the packing 90. The separation distance from the center line CL of the restoring force acting on the battery cell from each extension is the same. For that reason, the restoring forces of the two lateral extension portions more effectively cancel the rotational moments occurring in the center CP of the battery cell. The restoring forces of the two height extension portions more effectively cancel the rotational moments occurring at the center CP of the battery cell.

(First Modification)

Figure 11:
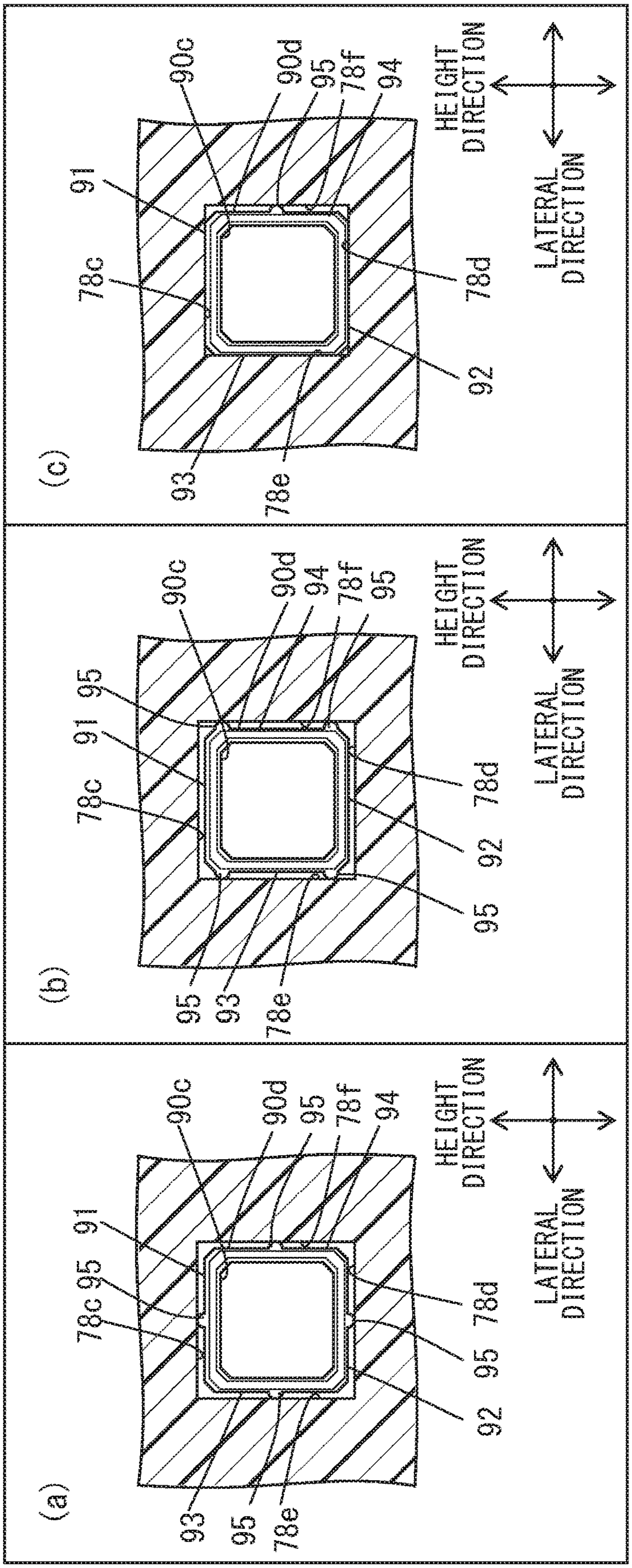
FIG. 11 is a diagram showing modifications of the packing.

In the present embodiment, the projection portions 95 are formed at both end portions of each of the four extension portions of the packing 90. However, the number and the formation position of the projection portions 95 are not particularly limited. For example, as shown in a column (a) of FIG. 11, the projection portion 95 may be formed at the center of each of the four extension portions of the packing 90. As shown in a column (b) of FIG. 11, projection portions 95 may be formed at both end portions of the first height extension portion 93 and the second height extension portion 94 of the packing 90. As shown in a column (c) of FIG. 11, a projection portion 95 may be formed in the central portion of the second height extension portion 94.

(Second Modification)

Figure 12:
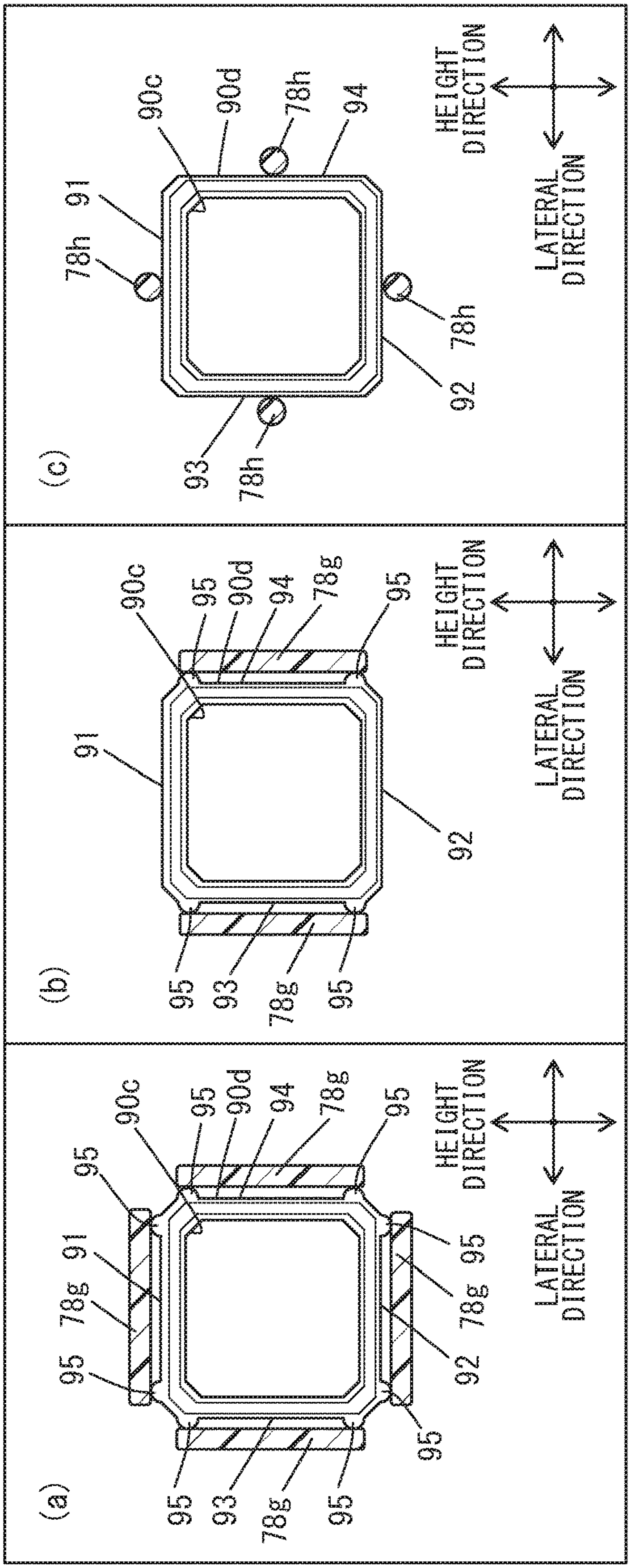
FIG. 12 is a diagram showing modifications of the regulation member.

In the present embodiment, the regulation member 78 is a recess portion locally recessed in the direction away from the battery case 61. However, the regulation member 78 may be a projection portion extending toward the battery case 61. For example, as shown in a column (a) of FIG. 12, the regulation member 78 may have four wall portions 78*g* that come in contact with each of the four extension portions of the packing 90. As shown in a column (b) of FIG. 12, the regulation member 78 may have two wall portions 78*g* which come in contact with the first height extension portion 93 and the second height extension portion 94 of the packing 90. As shown in a column (c) of FIG. 12, the regulation member 78 may have four pillars 78*h* which come in contact with each of the four extension portions.

(Third Modification)

Figure 13:
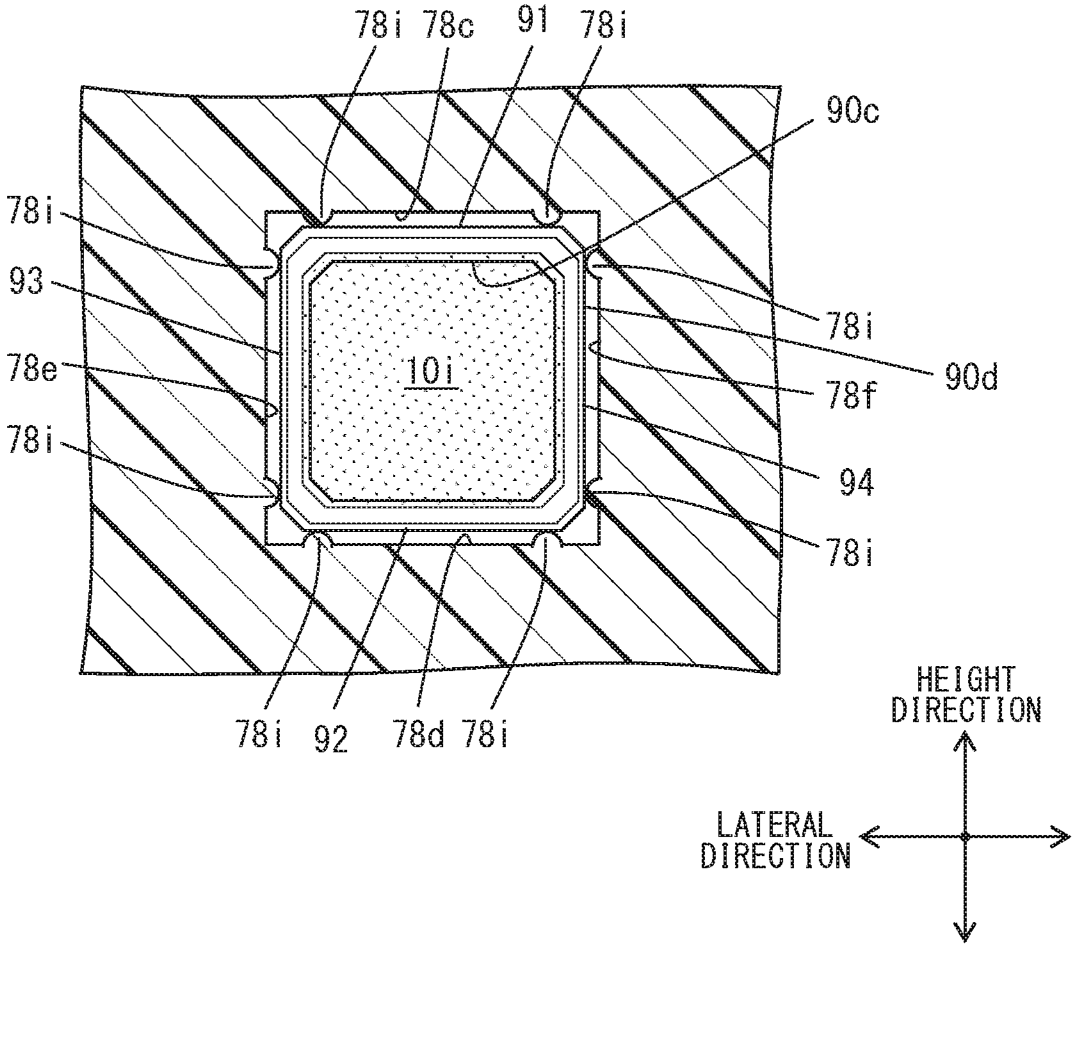
FIG. 13 is a cross-sectional view illustrating a modification of the packing and the regulation member.

In the present embodiment, the projection portions 95 are formed on the packing 90. However, a configuration can be employed in which projection portions 78*i* are provided on the regulation member 78. For example, as shown in FIG. 13, the projection portions 78*i* are provided on both end sides of each of the four surfaces of the regulation surface 78*b* of the regulation member 78. This also produces the same operational effects as those of the battery pack 100 shown in the present embodiment.

Figure 14:
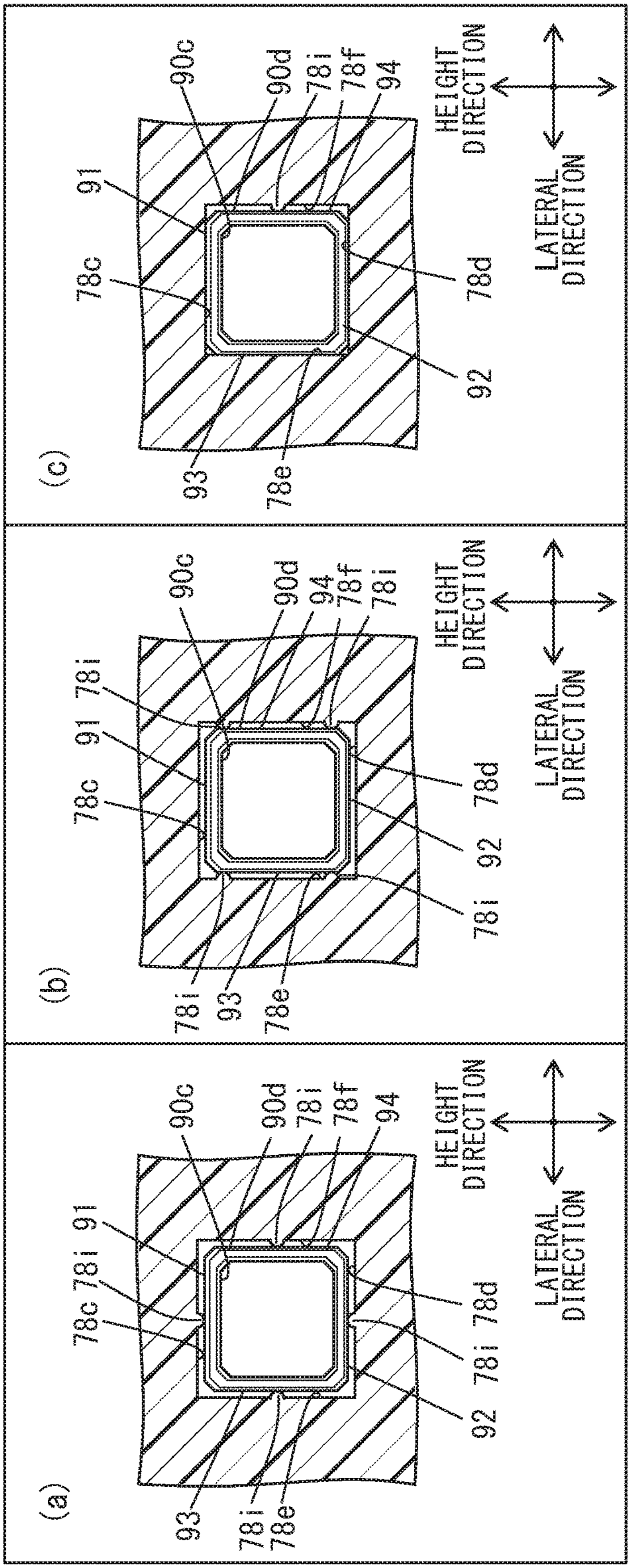
FIG. 14 is a diagram showing modifications of the regulation member.

The number and the formation position of the projection portions 78*i* are not particularly limited. For example, as shown in a column (a) of FIG. 14, the projection portion 78*i* may be formed at the center of each of the four surfaces of the regulation surface 78*b*. As shown in a column (b) of FIG. 14, the projection portions 78*i* may be formed on both end sides of each of the first height surface 78*e* and the second height surface 78*f* of the regulation surface 78*b*. As shown in a column (c) of FIG. 14, a projection portion 78*i* may be formed at the center of the second height surface 78*f*.

Second Embodiment

Next, a second embodiment will be described with reference to FIGS. 15 and 16. A battery pack according to each embodiment to be described below has many points in common with those according to the embodiment described above. For that reason, the description of the common portions will be omitted below, and different portions will be described with emphasis. In the following description, the same reference numerals are given to the same elements as those shown in the above embodiment.

In the first embodiment, the regulation surface 78*b* of the concave regulation member 78 and the outer side surface 90*d* of the packing 90 are in contact with each other. A regulation member 78 according to the present embodiment has a convex shape. A side peripheral surface 78*k* of the regulation member 78 and an inner side surface 90*c* of the packing 90 are in contact with each other.

Figure 15:
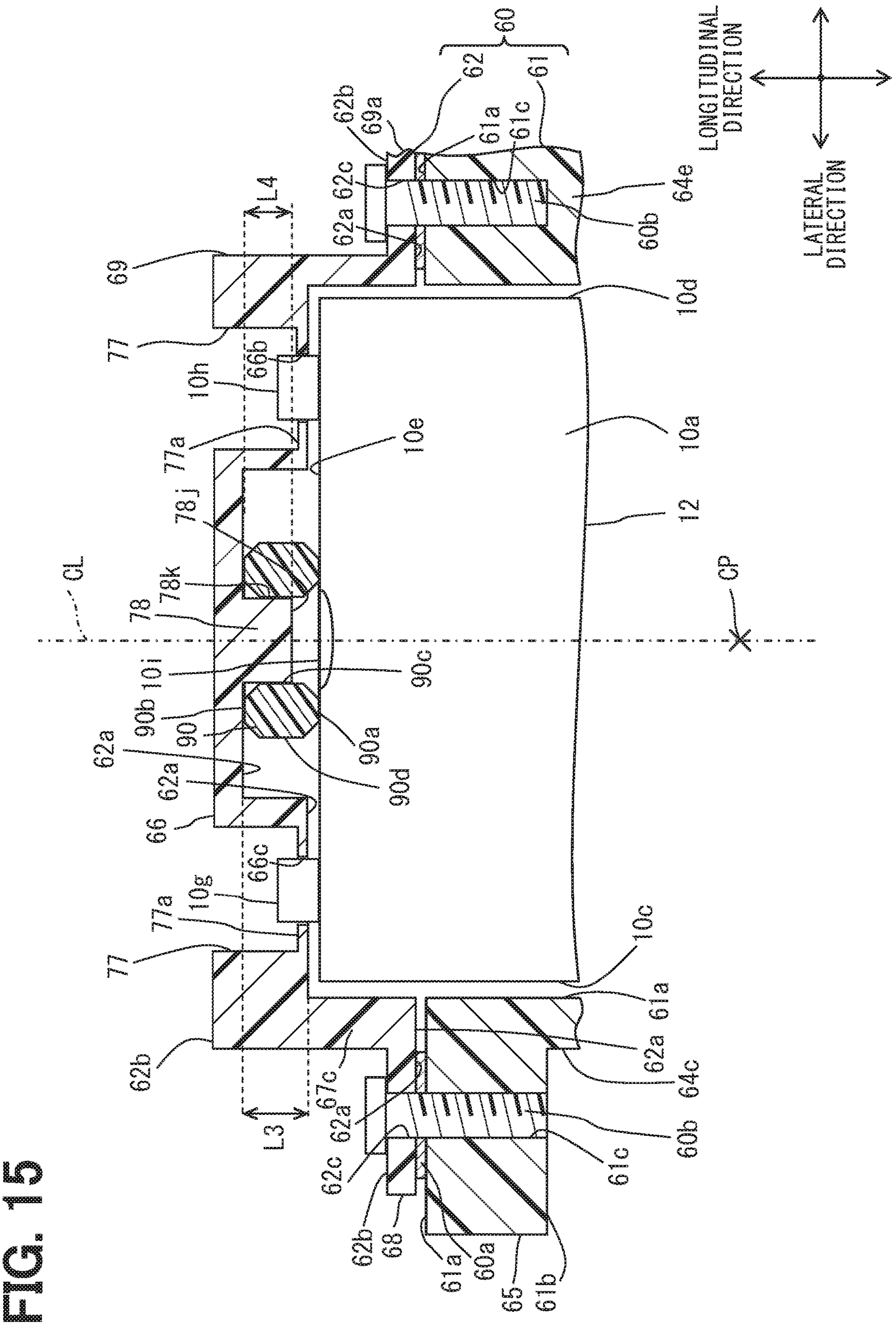
FIG. 15 is a cross-sectional view illustrating a packing and a regulation member according to a second embodiment.
Figure 16:
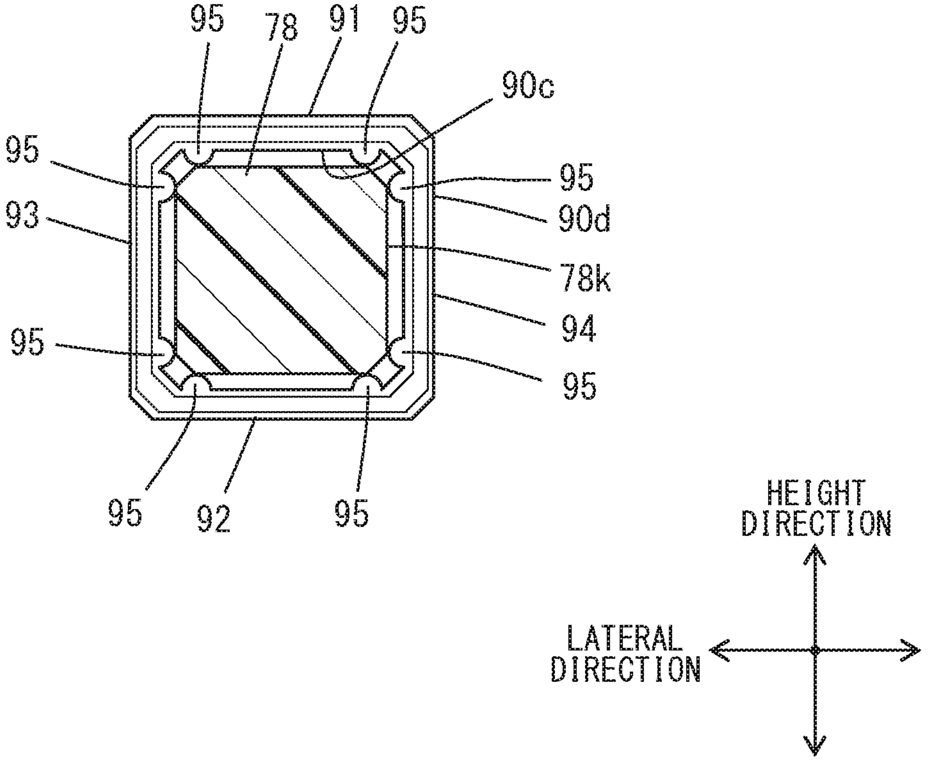
FIG. 16 is a cross-sectional view illustrating the packing and the regulation member.

As shown in FIGS. 15 and 16, the regulation member 78 extends from a lid wall 66 to a battery cell side. The regulation member 78 has a prismatic shape. An upper surface 78*j* of the regulation member 78 is opposed to a safety valve 10*i* in the longitudinal direction so as to be separated from the safety valve 10*i*. The side peripheral surface 78*k* of the regulation member 78 is in contact with the inner side surface 90*c* of the packing 90 in the surface direction. In the present embodiment, the side peripheral surface 78*k* corresponds to a regulation surface.

In the present embodiment, the inner surface 62*a* of the lid wall 66 and the inner surface 62*a* of the bottom portion 77*a* in which the opening is provided are separated from each other by a length L3 in the longitudinal direction. A packing 90 is provided between the inner surface 62*a* of the lid wall 66 and the upper end surface 10*e* of the battery cell. The inner surface 62*a* of the lid wall 66 corresponds to the facing surface.

A length L4 of the regulation member 78 in the longitudinal direction is shorter than a length L3. As a result, a contact between the regulation member 78 and the safety valve 10*i* is avoided. However, the length L4 is longer than half of a length Lp of the packing 90 in the longitudinal direction. Therefore, a distance between the upper surface 78*j* of the regulation member 78 and the upper end surface 10*e* on which the safety valve 10*i* is formed is shorter than half of the length Lp. As a result, a displacement of the elastically deformed packing 90 toward the safety valve 10*i* is inhibited.

The center of the regulation member 78 and the center of the safety valve 10*i* are aligned in the longitudinal direction. A maximum length of the regulation member 78 in the surface direction is shorter than a maximum length of a region in which the safety valve 10*i* is formed in the surface direction. A longest difference in the surface direction between the regulation member 78 and the safety valve 10*i* is shorter than a shortest distance between a portion which comes in contact with the side peripheral surface 78*k* of the regulation member 78 on the inner side surface 90*c* of the intermediate portion of the packing 90 and a portion which comes in contact with the upper end surface 10*e* on the first end surface 90*a* of the packing 90. For that reason, the first end surface 90*a* of the packing 90 is out of contact with the safety valve 10*i*, and a part of the inner side surface 90*c* of the packing 90 is separately opposed to the safety valve 10*i* in the longitudinal direction.

As shown in FIG. 16, a part of the inner side surface 90*c* of each of the four extension portions of the packing 90 protrudes toward the center side of the packing 90. As a result, the shapes of the inner side surface 90*c* and the side peripheral surface 78*k* facing each other in the surface direction are different from each other. Each of the four extension portions has a projection portion 95 formed along the surface direction and locally protruding toward the center of the packing 90. These projection portions 95 are formed at both end portions of each of the four extension portions in the same manner as in the first embodiment.

As described above, the battery pack 100 according to the present embodiment has the same configuration as that of the battery pack 100 shown in the first embodiment. For that reason, it is needless to say that the battery pack 100 according to the present embodiment exhibits the same operational effects as those of the battery pack 100 shown in the first embodiment.

(Fourth Modification)

Figure 17:
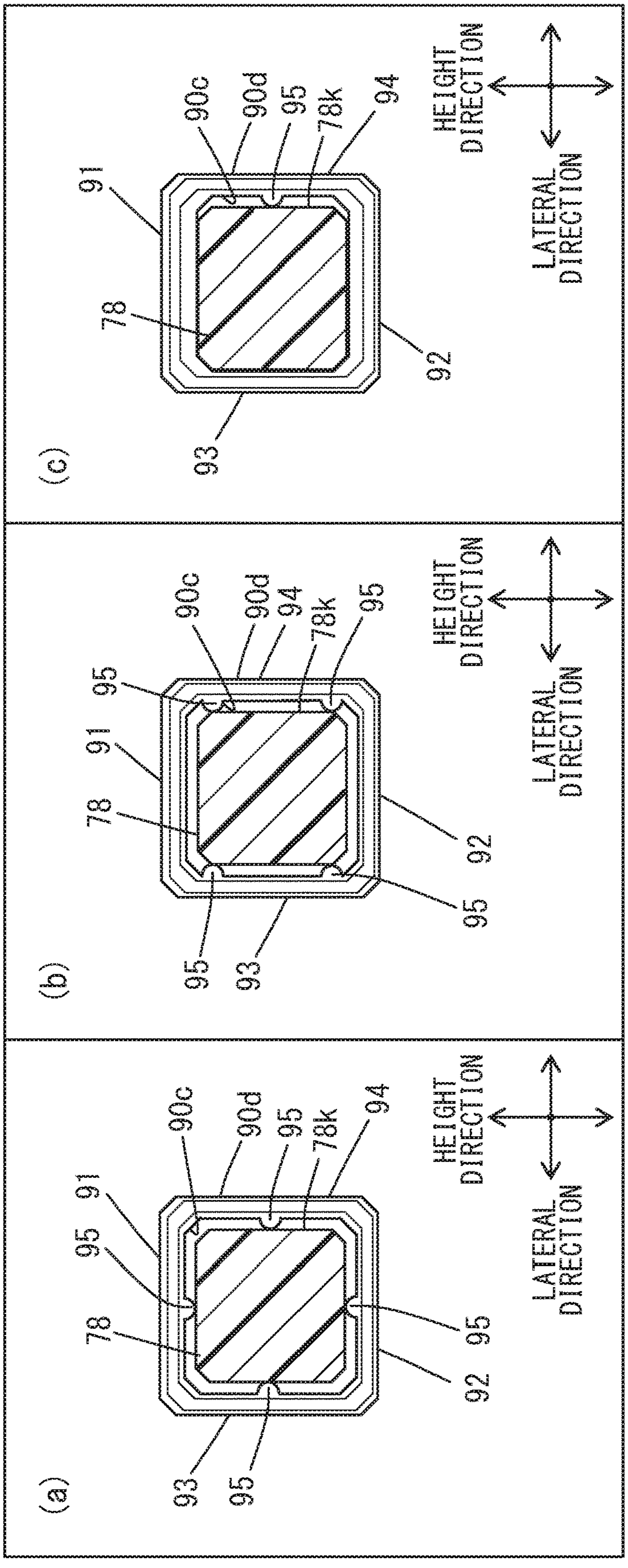
FIG. 17 is a diagram showing modifications of the packing.

In the present embodiment, the projection portions 95 are formed at both ends of the inner side surface 90*c* of each of the four extension portions of the packing 90. However, for example, as shown in a column (a) of FIG. 17, the projection portion 95 may be formed at the center of the inner side surface 90*c* of each of the four extension portions of the packing 90. As shown in a column (b) of FIG. 17, projection portions 95 may be formed at both ends of the inner side surface 90*c* of each of the first height extension portion 93 and the second height extension portion 94 of the packing 90. As shown in a column (c) of FIG. 17, a projection portion 95 may be formed at the center of the inner side surface 90*c* of the second height extension portion 94.

(Fifth Modification)

Figure 18:
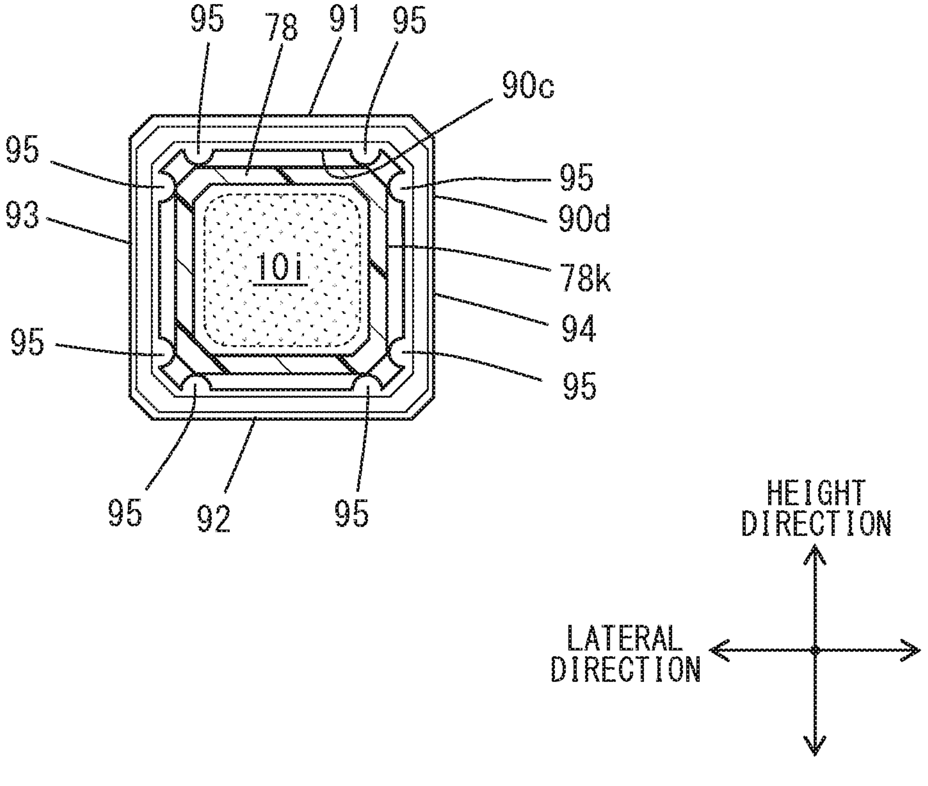
FIG. 18 is a cross-sectional view showing a modification of the packing and the regulation member.

In the present embodiment, the regulation member 78 has a prismatic shape extending from the lid wall 66 to the battery cell side. However, for example, as shown in FIG. 18, the regulation member 78 may have a cylindrical shape extending from the lid wall 66 to the battery cell side. In this modification, a region in which the safety valve 10*i* is formed and a hollow of the regulation member 78 indicated by hatching and a dashed line in FIG. 18 are disposed side by side in the longitudinal direction. For that reason, a contact between the regulation member 78 and the safety valve 10*i* is avoided.

Figure 19:
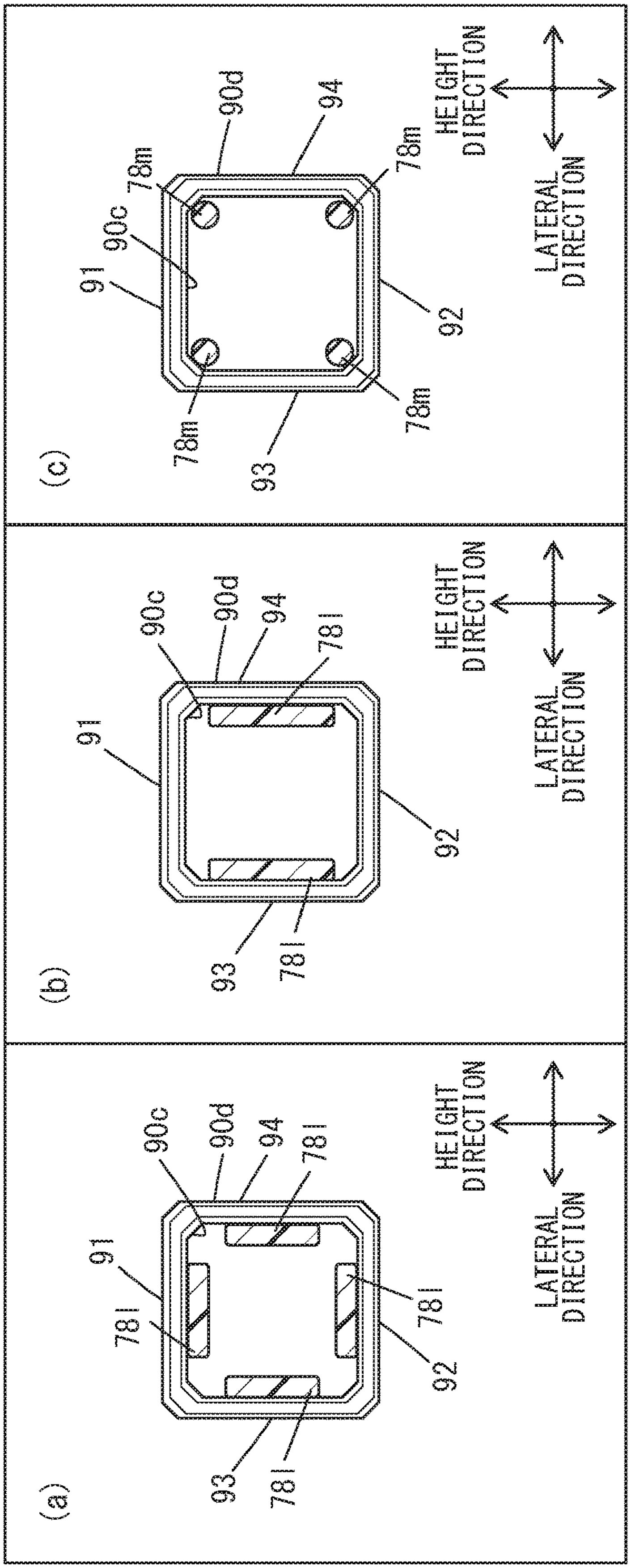
FIG. 19 is a diagram showing modifications of the regulation member.

Further, for example, as shown in a column (a) of FIG. 19, the regulation member 78 may have four wall portions 78*l* that come in contact with the inner side surface 90*c* of each of the four extension portions of the packing 90. As shown in a column (b) of FIG. 19, the regulation member 78 may have two wall portions 78*l* that come in contact with the inner side surface 90*c* of each of the first height extension portion 93 and the second height extension portion 94 of the packing 90. As shown in a column (c) of FIG. 19, the regulation member 78 may have four pillars 78*m* that come in contact with the inner side surface 90*c* of each of the four extension portions.

(Sixth Modification)

Figure 20:
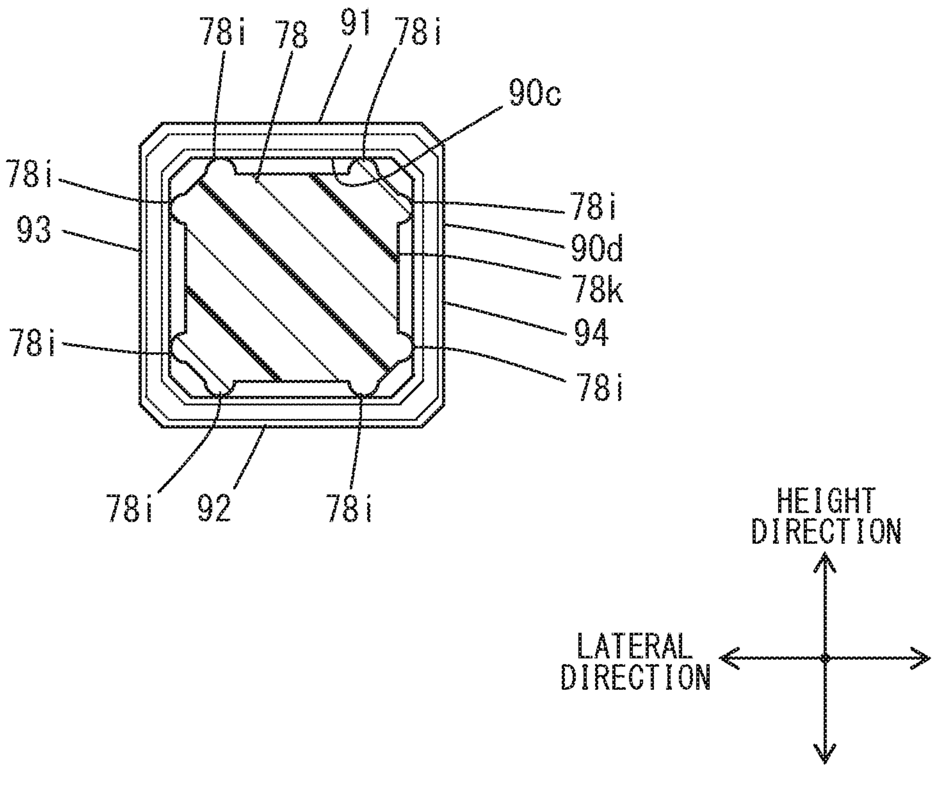
FIG. 20 is a cross-sectional view showing a modification of the regulation member.
Figure 21:
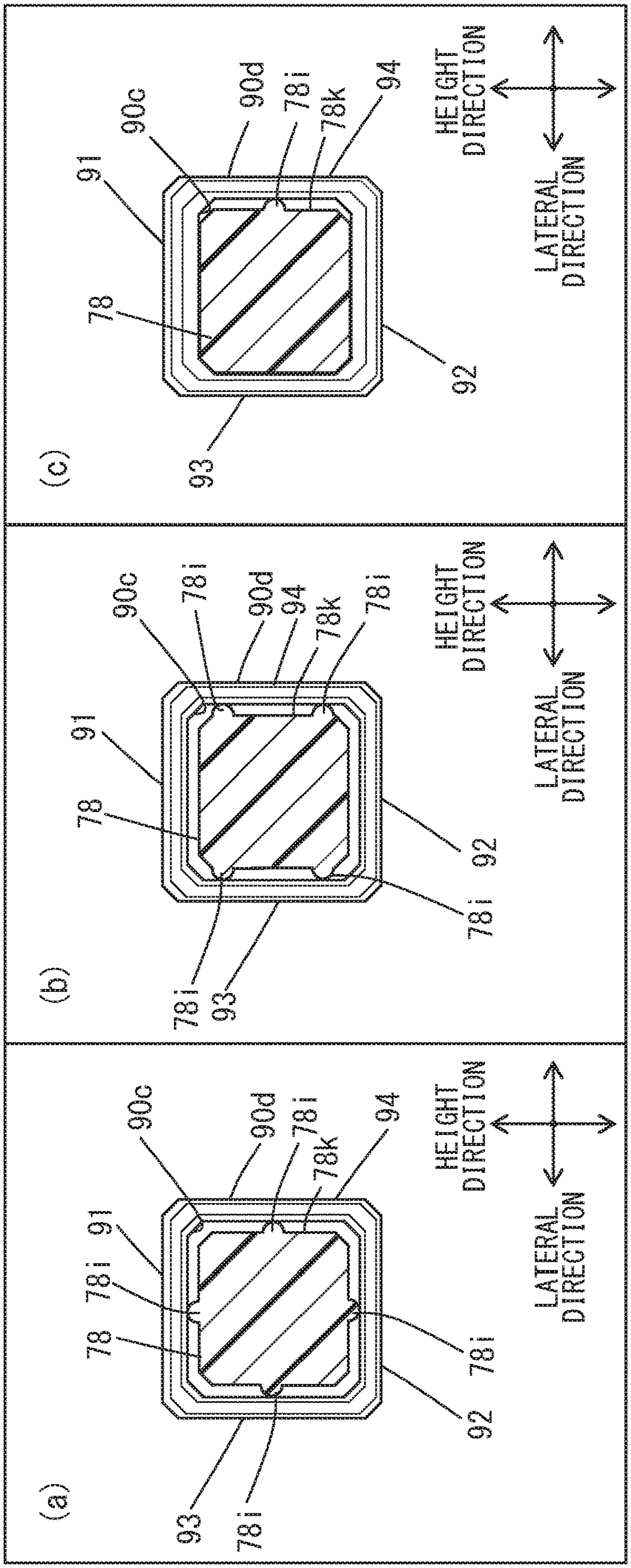
FIG. 21 is a diagram showing modifications of the regulation member.

For example, as shown in FIG. 20, projection portions 78*i* are formed on both end sides of each of the four surfaces of the side peripheral surface 78*k* of the regulation member 78. Further, for example, as shown in a column (a) of FIG. 21, the projection portion 78*i* may be formed at the center of each of the four surfaces of the side peripheral surface 78*k*. As shown in a column (b) of FIG. 21, the projection portions 78*i* may be formed on both end sides of each of the two surfaces disposed side by side in the lateral direction of the side peripheral surface 78*k*. As shown in a column (c) of FIG. 21, the projection portion 78*i* may be formed at the center of one of the two surfaces disposed side by side in the lateral direction of the side peripheral surface 78*k*.

Although the preferred embodiments of the present disclosure have been described above, the present disclosure is not limited to the embodiments described above, and can be implemented by various modifications without departing from the spirit of the present disclosure.

(Seventh Modification)

Figure 22:
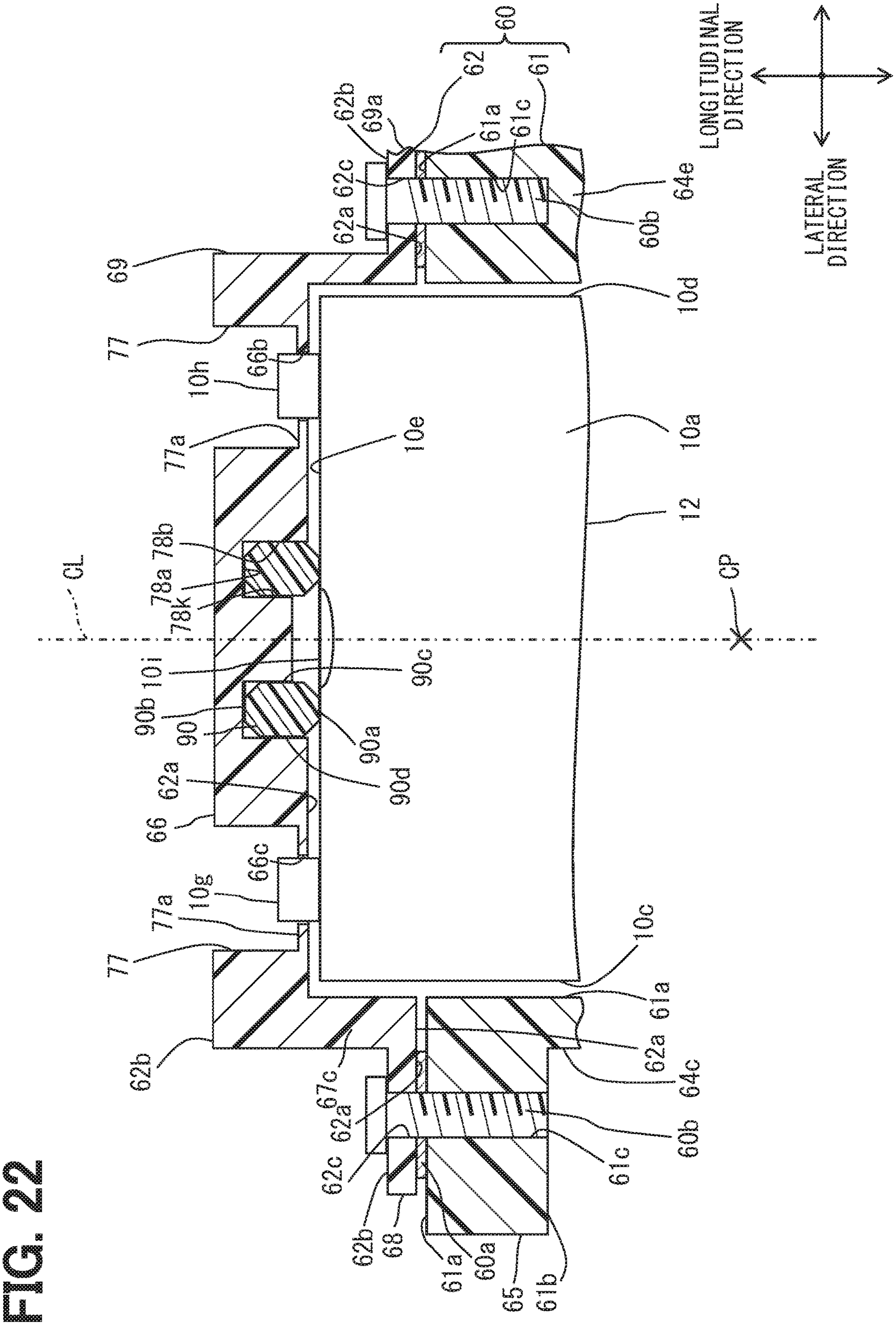
FIG. 22 is a cross-sectional view showing a modification of the regulation member.

As shown in FIG. 22, a configuration can be employed in which the regulation member 78 has a regulation surface 78*b* which comes in contact with the outer side surface 90*d* of the packing 90 and a side peripheral surface 78*k* which comes in contact with the inner side surface 90*c* of the packing 90.

(Eighth Modification)

Figure 23:
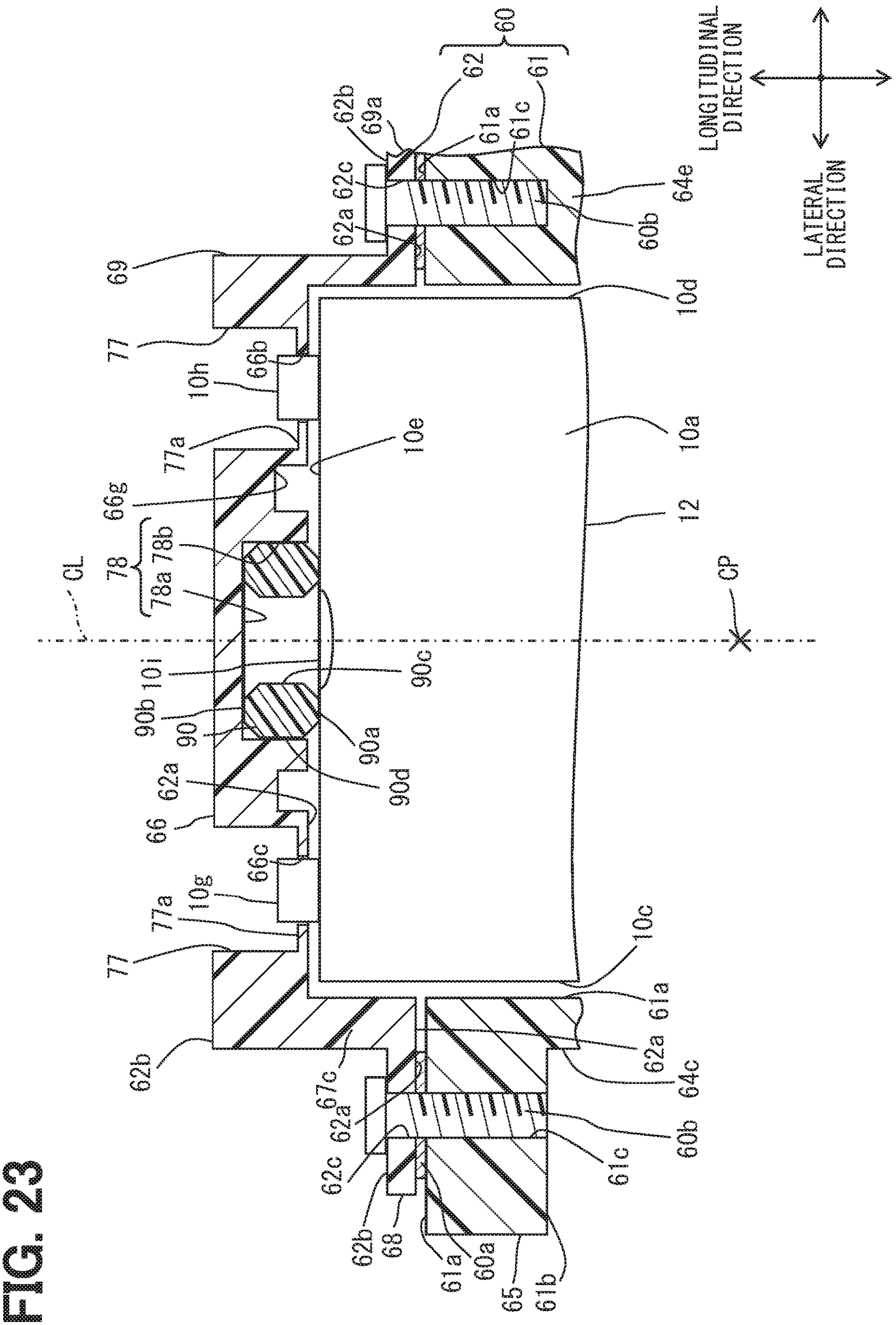
FIG. 23 is a cross-sectional view showing a modification of the wiring case.

As shown in FIG. 23, a configuration can be employed in which thin portions 66*g* are provided in the lid wall 66.

(Ninth Modification)

Figure 24:
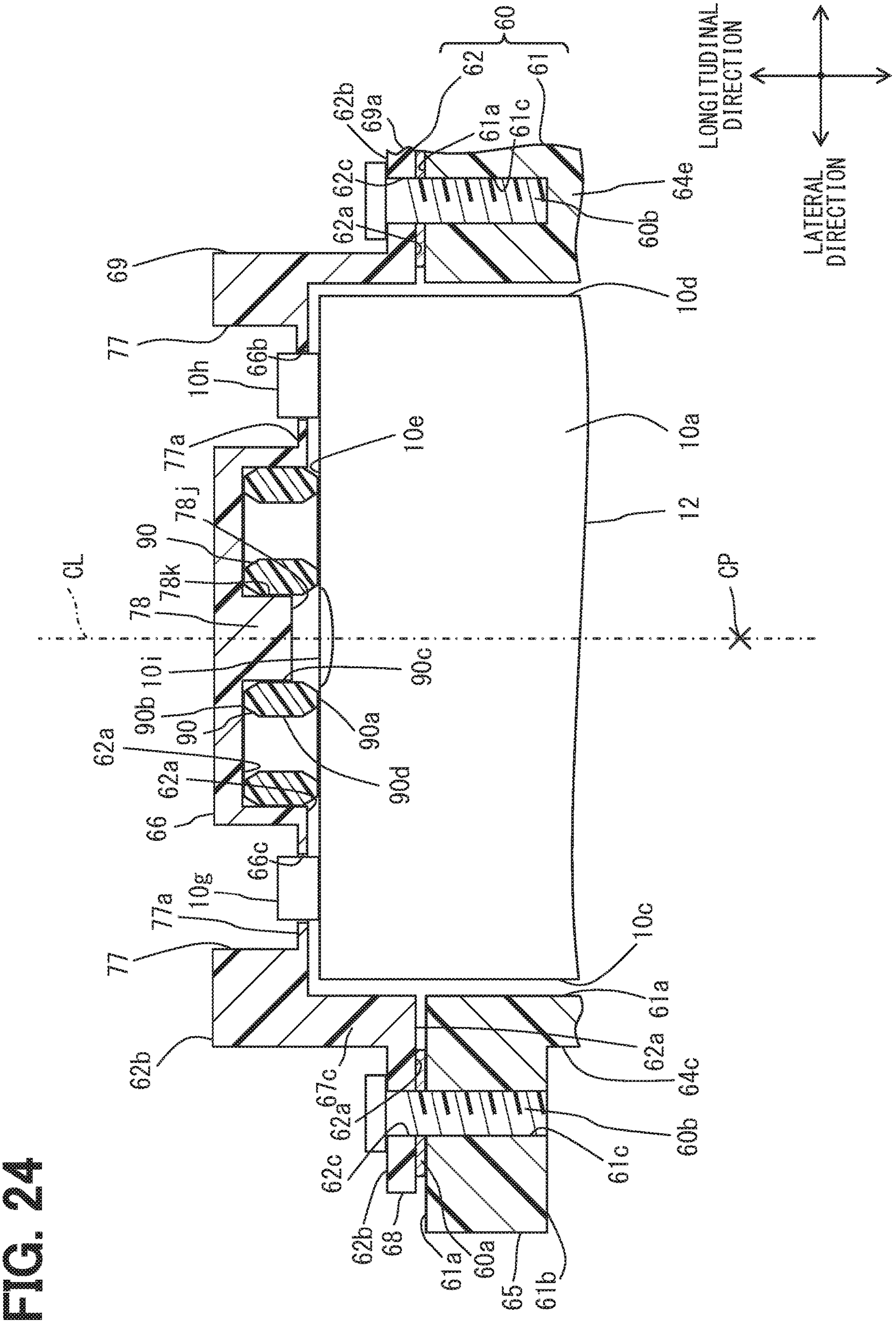
FIG. 24 is a cross-sectional view showing a modification of the packing.

As shown in FIG. 24, a configuration can be employed in which two packings 90 are provided in one battery cell.

(Tenth Modification)

The packing 90 does not configure a passage for exhausting a gas generated inside the battery cell from the safety valve 10*i* of the battery cell. For that reason, various configurations can be adopted as the shape of the packing 90.

Figure 25:
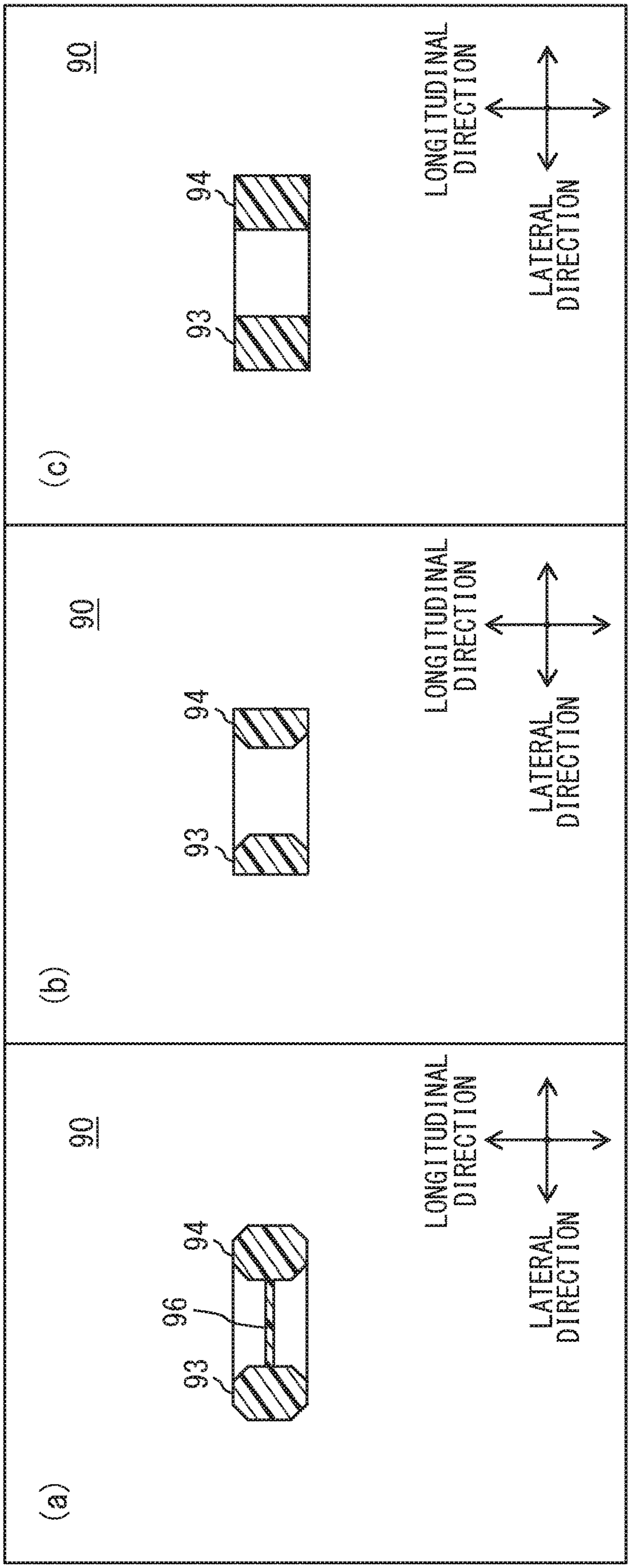
FIG. 25 is a diagram showing modifications of the packing.

For example, as shown in a column (a) of FIG. 25, the packing 90 may have a coupling film 96 for coupling the inner side surfaces 90*c* to each other. This inhibits elastic deformation of the packing 90 toward the center. As shown in a column (b) of FIG. 25, a shape can be employed in which a cross-sectional shape orthogonal to an extending direction of each of the extension portions of the packing 90 is asymmetric. As shown in a column (c) of FIG. 25, a shape can be employed in which a length in the surface direction of the cross-sectional shape orthogonal to the extending direction of each of the extension portions of the packing 90 is constant.

Figure 26:
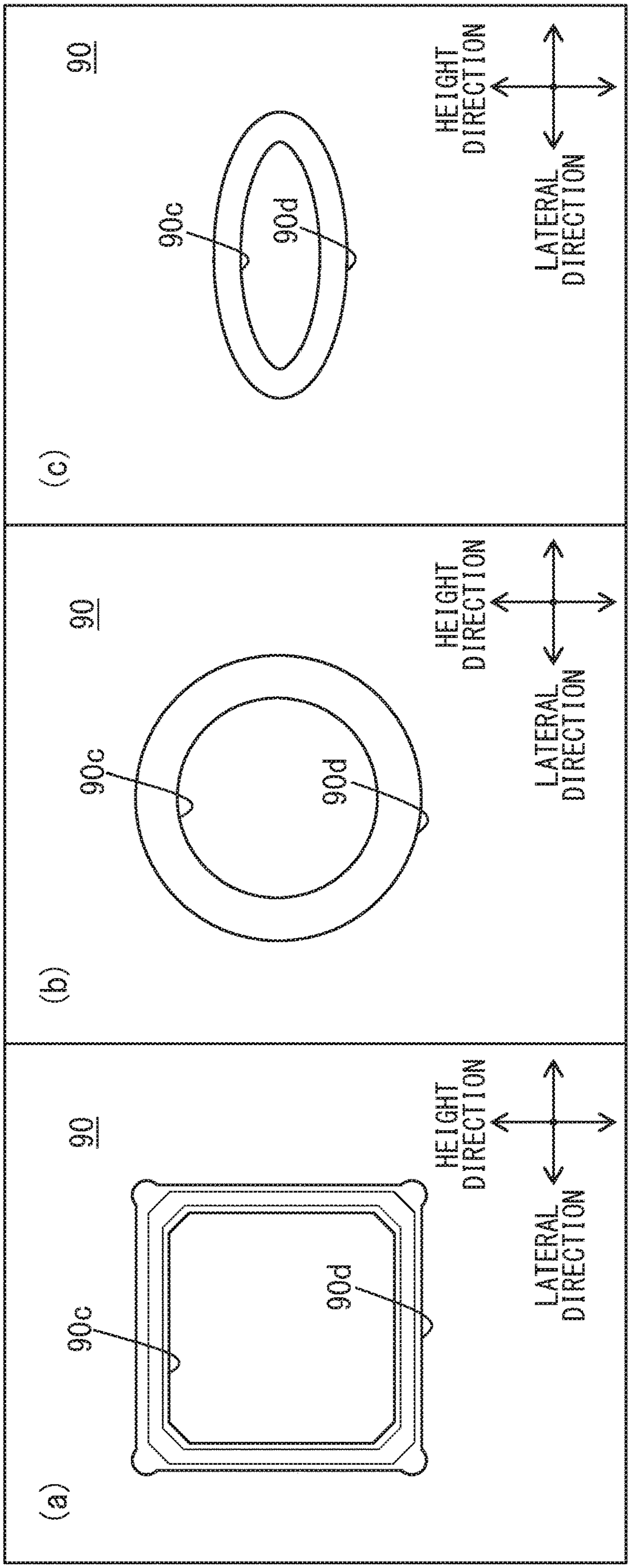
FIG. 26 is a diagram showing modifications of the packing.
Figure 27:
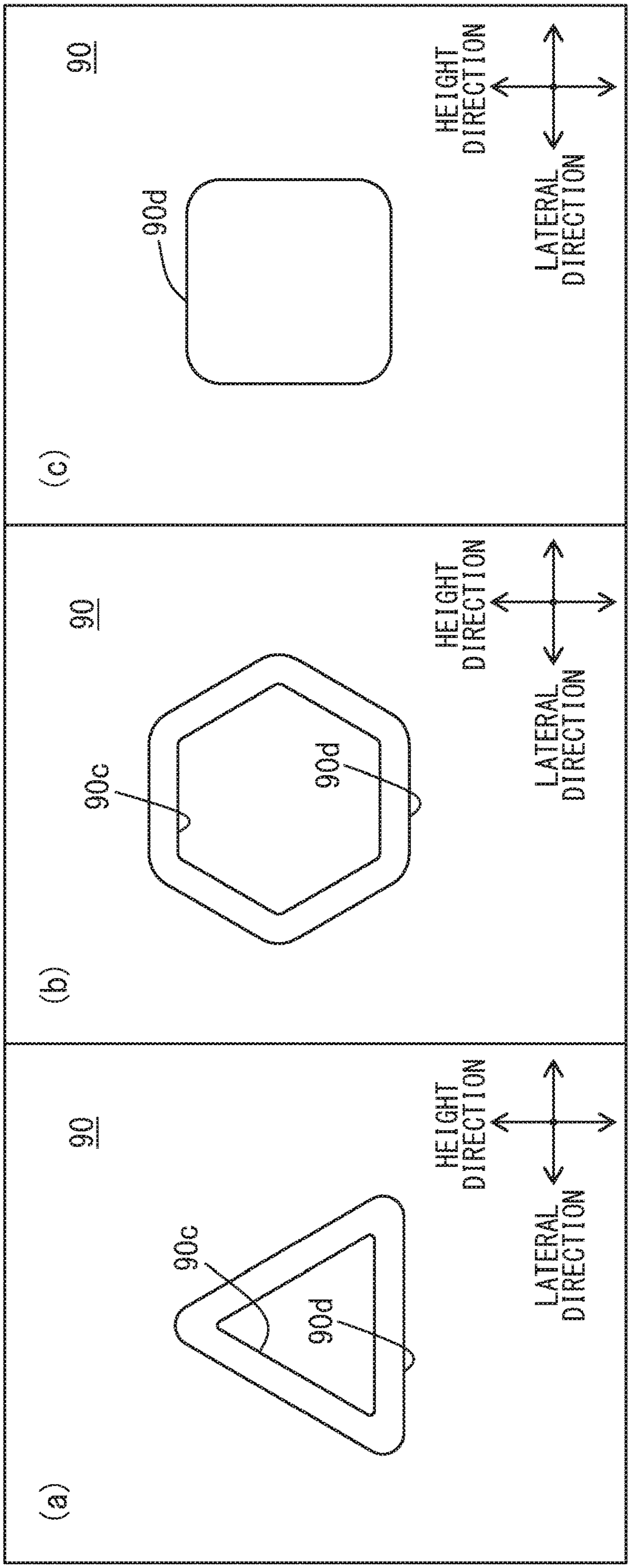
FIG. 27 is a diagram showing modifications of the packing.

Further, for example, as shown in a column (a) of FIG. 26, a configuration can be employed in which the projection portions 95 are formed at the ends to which the four extension portions of the packing 90 are connected. As shown in a column (b) of FIG. 26, a circular ring (toric ring) may be adopted as the packing 90. As shown in a column (c) of FIG. 26, as the packing 90, an oval ring may be adopted. As shown in a column (a) of FIG. 27, a triangular ring may be adopted as the packing 90. As shown in a column (b) of FIG. 27, a hexagonal ring shape may be adopted as the packing 90. As shown in a column (c) of FIG. 27, the packing 90 may have a rectangular shape. In other words, although not shown, an annular shape having a gap may be adopted as the packing 90. In other words, a C-shape can be adopted as the packing 90. As described above, the shape of the packing 90 is not particularly limited.

(Other Modifications)

In the present embodiment, the assembled battery 10 has five battery cells. However, the assembled battery 10 may have two or more battery cells, and is not limited to the above example.

In the present embodiment, the assembled battery 10 has two cell stacks. However, as the number of the cell stacks, one or more than two may be adopted instead of two.

In the present embodiment, the battery cells of the cell stack are aligned in the height direction. However, the direction in which the battery cells are aligned is not particularly limited, and the battery cells may be aligned in the longitudinal direction or the lateral direction.

In the present embodiment, the vehicle on which the power supply system 200 is mounted has an idle stop function. However, the vehicle in which the power supply system 200 is mounted is not limited to the above example. For example, a hybrid vehicle or an electric vehicle can be employed. In this case, the starter motor 120 and the rotary electric machine 130 shown in the present embodiment are replaced with the motor generator.

What is claimed is:

1. A battery pack comprising:
an assembled battery having a plurality of battery cells;
a battery case that houses the assembled battery;
a wiring case that is assembled to the battery case;
a coupling portion that connects the battery case and the wiring case in a state that the battery case and the wiring case are coupled to each other; and
an elastic member that is in contact with a battery cell which is one of the plurality of battery cells and the wiring case and is held between the battery cell and the wiring case, wherein
a safety valve having a lower rigidity than a rigidity of a first surface of the battery cell is formed on the first surface of the battery cell,
a first end surface of the elastic member is in contact with a region in which the safety valve is not formed on the first surface of the battery cell, and a second end surface of the elastic member opposite to the first end surface is in contact with a facing surface of the wiring case that faces the first surface of the battery cell,
the wiring case has a regulation member that is in contact with a side surface of the elastic member which connects the first end surface to the second end surface to regulate movement of the elastic member in a surface direction along the first surface of the battery cell, and
the regulation member is formed of a portion of an inner wall of the wiring case.

2. The battery pack according to claim 1, wherein
the side surface of the elastic member faces a regulation surface of the regulation member in the surface direction,
a shape of the side surface of the elastic member facing the regulation surface of the regulation member on a plane orthogonal to the first surface is different from a shape of the regulation surface of the regulation member facing the side surface of the elastic member on the plane orthogonal to the first surface, and
the side surface of the elastic member and the regulation surface of the regulation member are in partial contact with each other.

3. The battery pack according to claim 2, wherein a part of the side surface of the elastic member locally protrudes toward the regulation surface of the regulation member and is in contact with the regulation surface of the regulation member.

4. The battery pack according to claim 3, wherein the part of the side surface of the elastic member that locally protrudes toward the regulation surface of the regulation member is one of a plurality of protrusions, and each of the plurality of the protrusions are in contact with the regulation surface of the regulation member.

5. The battery pack according to claim 2, wherein a part of the regulation surface of the regulation member locally protrudes toward the side surface and is in contact with the side surface of the elastic member.

6. The battery pack according to claim 5, wherein the part of the regulation surface of the regulation member that locally protrudes toward the side surface is one of a plurality of the protrusions, and each of the plurality of the protrusions are in contact with the side surface of the elastic member.

7. The battery pack according to claim 2, wherein
the first end surface of the elastic member is in annular contact with the first surface, and the safety valve is located in an inner region of the first surface surrounded by a region in contact with the first end surface of the elastic member,
the side surface of the elastic member includes an inner side surface and an outer side surface, and the outer side surface is farther from the safety valve in the surface direction than the inner side surface, and
a part of the outer side surface is in contact with the regulation surface of the regulation member.

8. The battery pack according to claim 1, wherein
the side surface of the elastic member faces a regulation surface of the regulation member in the surface direction,
the first end surface is in annular contact with the first surface, and the safety valve is located in an inner region surrounded by a region in contact with the first end surface on the first surface,
the side surface of the elastic member includes an inner side surface and an outer side surface, and the outer side surface is farther from the safety valve in the surface direction than the inner side surface, and
the inner side surface is in contact with the regulation surface of the regulation member.

9. The battery pack according to claim 1, wherein a cross-sectional area in the surface direction of an intermediate portion of the elastic member between the first end surface and the second end surface is larger than a contact area of the first end surface with the first surface.

10. The battery pack according to claim 9, wherein a side surface of the intermediate portion of the elastic member and the safety valve face each other in a direction orthogonal to the first surface.

11. The battery pack according to claim 1, wherein
the safety valve is positioned on a center line passing through a center of the battery cell along a direction orthogonal to the first surface, and
the elastic member is positioned on a first direction side and a second direction side, which are separated from the center line in the surface direction from each other and the first direction side and the second direction side are in contact with the first surface.

12. The battery pack according to claim 1, wherein the inner wall of the wiring case is perpendicular to the first surface of the battery cell.

13. The battery pack according to claim 1, wherein the inner wall of the wiring case is in direct contact with the side surface of the elastic member.

14. The battery pack according to claim 1, wherein the second end surface of the elastic member is in direct contact with the facing surface of the wiring case.

15. The battery pack according to claim 1, wherein:
the elastic member is a first one of a plurality of elastic members,
the side surface of each of the plurality of elastic members includes an inner side surface and an outer side surface, and the outer side surface is farther from the safety valve in the surface direction than the inner side surface, and
a second elastic member of the plurality of elastic members is coupled to the first elastic member by a coupling film that extends between the inner side surface of the first elastic member and the inner side surface of the second elastic member.

* * * * *